United States Patent
Kaihoko et al.

(10) Patent No.: US 8,654,287 B2
(45) Date of Patent: Feb. 18, 2014

(54) ACRYL-BASE POLYMER FILM, OPTICAL COMPENSATION FILM, AND LIQUID-CRYSTAL DISPLAY DEVICE HAVING THE SAME

(75) Inventors: Hiroyuki Kaihoko, Kanagawa (JP); Tatsuho Nomura, Kanagawa (JP); Ryuta Takegami, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 945 days.

(21) Appl. No.: 12/567,054

(22) Filed: Sep. 25, 2009

(65) Prior Publication Data
US 2010/0245725 A1 Sep. 30, 2010

(30) Foreign Application Priority Data

Sep. 26, 2008 (JP) ................................ 2008-247733
Mar. 31, 2009 (JP) ................................ 2009-086914

(51) Int. Cl.
G02F 1/1335 (2006.01)
G02F 1/1343 (2006.01)

(52) U.S. Cl.
USPC ............ 349/117; 349/118; 349/121; 349/141

(58) Field of Classification Search
USPC ........................................ 349/117–121, 141
See application file for complete search history.

(56) References Cited

U.S. PATENT DOCUMENTS

| | | | |
|---|---|---|---|
| 7,250,200 B2 * | 7/2007 | Elman | 428/1.3 |
| 8,164,722 B2 * | 4/2012 | Ohmuro et al. | 349/119 |
| 8,184,245 B2 * | 5/2012 | Ohashi | 349/117 |
| 8,305,545 B2 | 11/2012 | Chang et al. | |
| 2005/0105025 A1 * | 5/2005 | Ootake | 349/114 |
| 2005/0200779 A1 * | 9/2005 | Ishikawa et al. | 349/118 |
| 2005/0200792 A1 * | 9/2005 | Jeon et al. | 349/141 |
| 2006/0072056 A1 * | 4/2006 | Nagai et al. | 349/117 |
| 2006/0164579 A1 | 7/2006 | Yano | |
| 2007/0030431 A1 * | 2/2007 | Lee et al. | 349/141 |
| 2007/0076155 A1 * | 4/2007 | Nakayama et al. | 349/118 |
| 2007/0243367 A1 * | 10/2007 | Nagatake et al. | 428/221 |
| 2007/0258032 A1 * | 11/2007 | Kaihoko et al. | 349/141 |

(Continued)

FOREIGN PATENT DOCUMENTS

JP 06-222213 8/1994
JP 2003-025414 1/2003

(Continued)

OTHER PUBLICATIONS

Yoshihara et al., English language translation of Japanese Unexamined Patent Application Publication JP 2007-264534 A, 2013, USPTO.*

(Continued)

*Primary Examiner* — Mike Qi
(74) *Attorney, Agent, or Firm* — Young & Thompson

(57) ABSTRACT

The invention relates to an optical compensation film for IPS or FFS-mode liquid crystal display devices, having the tilt angle β[°] not equal to zero, β[°] being defined as φ giving the minimum value of retardation R[φ] which is retardation measured for incident light coming in a direction tilted by φ° from a normal line relative to the film-plane, the direction being in a plane including the direction perpendicular to the in-plane slow axis thereof and the normal line; and having retardation along the thickness direction at a wavelength of 550 nm, Rth(550), not equal to zero.

17 Claims, 2 Drawing Sheets

(56) References Cited

U.S. PATENT DOCUMENTS

| | | | |
|---|---|---|---|
| 2007/0263152 A1* | 11/2007 | Mazaki et al. | 349/130 |
| 2008/0129922 A1* | 6/2008 | Kanemitsu et al. | 349/62 |
| 2009/0033839 A1* | 2/2009 | Fukuda | 349/102 |
| 2009/0066886 A1* | 3/2009 | Shimizu et al. | 349/96 |
| 2009/0091691 A1* | 4/2009 | Sato et al. | 349/96 |
| 2010/0078592 A1* | 4/2010 | Li et al. | 252/299.61 |
| 2011/0292324 A1* | 12/2011 | Kaihoko et al. | 349/96 |
| 2012/0293754 A1 | 11/2012 | Chang et al. | |
| 2012/0293758 A1* | 11/2012 | Chang et al. | 349/117 |
| 2012/0293764 A1 | 11/2012 | Chang et al. | |

FOREIGN PATENT DOCUMENTS

| | | |
|---|---|---|
| JP | 2005-173588 | 6/2005 |
| JP | 2005-265889 | 9/2005 |
| JP | 2006-227606 | 8/2006 |
| JP | 2007-038646 | 2/2007 |
| JP | 2007-264534 | 10/2007 |
| JP | 2007-264585 | 10/2007 |
| JP | 2007264534 A * | 10/2007 |
| JP | 2011-507009 | 3/2011 |
| WO | WO 2007024028 A1 * | 3/2007 |
| WO | 2009/072815 | 6/2009 |

OTHER PUBLICATIONS

Japanese Official Action—2009-086914—Oct. 2, 2012.

* cited by examiner (a)

(b)

ACRYL-BASE POLYMER FILM, OPTICAL COMPENSATION FILM, AND LIQUID-CRYSTAL DISPLAY DEVICE HAVING THE SAME

CROSS-REFERENCE TO RELATED APPLICATIONS

This application claims benefit of priority under 35 U.S.C. 119 to Japanese Patent Application Nos. 2008-247733, filed on Sep. 26, 2008, and 2009-086914, filed on Mar. 31, 2009, which are expressly incorporated herein by reference in its entirety.

BACKGROUND OF THE INVENTION

1. Technical Field

The present invention relates to a novel acryl-base polymer film useful as optical members of liquid-crystal display devices, etc., to a novel optical compensation film for IPS or FFS-mode liquid-crystal display devices, and to an IPS or FFS-mode liquid-crystal display device having the film.

2. Background Art

Heretofore, in-plane switching (IPS) mode and fringe-field switching (FFS) mode liquid-crystal display devices have been proposed, where liquid-crystal molecules act to switch in a horizontal alignment state relative to the substrate, and in fact, they have been put into practical use. IPS-mode and FFS-mode liquid-crystal display devices are excellent in the viewing angle characteristics but have a problem of light leakage in oblique directions in the black state.

To overcome the problem of light leakage in oblique directions in the black state, proposed is use of a cellulose acylate film satisfying predetermined optical characteristics, as a protective film for the polarizing plate to be proposed between the liquid-crystal cell and the polarizing element (JP-A 2006-227606). Also proposed is disposition of a C-plate and a biaxial film between the liquid-crystal cell and the polarizing element (JP-A 2005-265889).

As an IPS-mode liquid-crystal display device having solved a problem of visibility failure owing to light leakage, color unevenness, color shift and the like around frames, proposed are use of a protective film having predetermined optical characteristics for the protective film of the polarizing plate to be disposed on the side of the liquid-crystal cell, and use of an acryl-base polymer film as one example of the protective film (JP-A 2007-264534).

On the other hand, JP-A 2007-38646 proposes a method of producing an optical film whose optical axis is inclined in the thickness direction by having a melt of thermoplastic polymer composition through the nip between two rolls running at a certain condition.

SUMMARY OF THE INVENTION

However, there is a demand for further advanced image quality in the art, and it is desired to further improve the display characteristics of liquid-crystal display devices.

Accordingly, an object of the present invention is to provide a novel acryl-base polymer film and an optical compensation film capable of solving the problem of light leakage in oblique directions of IPS-mode, FFS-mode or the like horizontal alignment-mode liquid-crystal display devices in the black state, thereby contributing toward attaining more ideal black state.

Another object of the invention is to provide an IPS-mode, FFS-mode or the like horizontal alignment-mode liquid-crystal display device capable of solving the problem of light leakage in oblique directions in the black state and capable of attaining more ideal black state.

The means for achieving the objects are as follows.

[1] An optical compensation film for IPS or FFS-mode liquid crystal display devices, having the tilt angle $\beta[°]$ not equal to zero, $\beta[°]$ being defined as $\phi$ giving the minimum value of retardation $R[\phi]$ which is retardation measured for incident light coming in a direction tilted by $\phi°$ from a normal line relative to the film-plane, the direction being in a plane including the direction perpendicular to the in-plane slow axis thereof and the normal line; and having retardation along the thickness direction at a wavelength of 550 nm, Rth(550), not equal to zero.

[2] The optical compensation film for IPS or FFS-mode liquid crystal display devices of [1], having retardation in plane at a wavelength of 550 nm, Re(550), of from −10 nm to 10 nm, and retardation along the thickness direction at the same wavelength, Rth(550), of from −30 nm to 30 nm (provided that Rth(550)≠0).

[3] The optical compensation film for IPS or FFS-mode liquid crystal display devices of [1] or [2], of which the wavelength dispersion characteristics of Re, |Re(630)−Re(450)|, is equal to or less than 1.5 nm, and the wavelength dispersion characteristics of Rth, |Rth(630)−Rth(450)|, is equal to or less than 4 nm.

[4] The optical compensation film for IPS or FFS-mode liquid crystal display devices of any one of [1]-[3], which is an acryl-base polymer film.

[5] The optical compensation film for IPS or FFS-mode liquid crystal display devices of [4], comprising as a major ingredient, an acryl-base polymer having at least one unit selected from the group consisting of lactone ring unit, maleic anhydride unit, and glutaric anhydride unit.

[6] The optical compensation film for IPS or FFS-mode liquid crystal display devices of any one of [1]-[3], which comprises a cycloolefin polymer-base film.

[7] An acryl-base polymer film, having the tilt angle $\beta[°]$ not equal to zero, $\beta[°]$ being defined as $\phi$ giving the minimum value of retardation $R[\phi]$ which is retardation measured for incident light coming in a direction tilted by $\phi$ from a normal line relative to the film-plane, the direction being in a plane including the direction perpendicular to the in-plane slow axis thereof and the normal line; and having retardation along the thickness direction at a wavelength of 550 nm, Rth(550), not equal to zero, wherein retardation in plane at a wavelength of 550 nm, Re(550), is from −10 nm to 10 nm;

retardation along the thickness direction at the same wavelength, Rth(550), is from −30 nm to 30 nm;

the wavelength dispersion characteristics of Re, |Re(630)−Re(450)|, is equal to or less than 1.5 nm; and the wavelength dispersion characteristics of Rth, |Rth(630)−Rth(450)|, is equal to or less than 4 nm.

[8] An IPS or FFS-mode liquid crystal display device comprising:

a pair of substrates at least one of which has an electrode and which are disposed to face each other, the electrode forming an electric field having a component parallel to the electrode-having substrate;

an alignment-controlled liquid-crystal layer disposed between the pair of substrates; and a pair of polarizers disposed to sandwich the liquid-crystal layer therebetween;

wherein at least one of the pair of polarizers has at least one optical compensation film of any one of [1]-[6].

[9] An IPS or FFS-mode liquid crystal display device comprising:
a pair of substrates at least one of which has an electrode and which are disposed to face each other, the electrode forming an electric field having a component parallel to the electrode-having substrate;
an alignment-controlled liquid-crystal layer disposed between the pair of substrates; and
a pair of polarizers disposed to sandwich the liquid-crystal layer therebetween;
wherein at least one of the pair of polarizers has at least one optical compensation film of any one of [7].

[10] An IPS or FFS-mode liquid-crystal display device comprising:
a pair of polarizing elements,
a liquid-crystal cell as horizontally aligned between the pair of polarizing elements, and
a film of any one of [1]-[7] individually between each of the pair of polarizing elements and the liquid-crystal cell.

[11] An IPS or FFS-mode liquid-crystal display device comprising:
a pair of polarizing elements, and
a horizontally liquid-crystal cell as horizontally aligned, disposed between the pair of polarizing elements,
a film of any one of [1]-[7] disposed between one of the pair of polarizing elements and the liquid-crystal cell, and
a cycloolefin-base polymer film disposed between the other of the pair of polarizing elements and the liquid-crystal cell.

[12] An IPS or FFS-mode liquid-crystal display device comprising:
a pair of polarizing elements,
a liquid-crystal cell as horizontally aligned, disposed between the pair of polarizing elements,
a film of any one of [1]-[7] disposed between one of the pair of polarizing elements and the liquid-crystal cell, and
an optically-biaxial film and a positive C-plate between the other of the pair of polarizing elements and the liquid-crystal cell.

According to the invention, it is possible to provide a novel acryl-base polymer film and an optical compensation film capable of solving the problem of light leakage in oblique directions of IPS-mode, FFS-mode or the like horizontal alignment-mode liquid-crystal display devices in the black state, thereby contributing toward attaining more ideal black state.

And according to the invention, it is also possible to provide an IPS-mode, FFS-mode or the like horizontal alignment-mode liquid-crystal display device capable of solving the problem of light leakage in oblique directions in the black state and capable of attaining more ideal black state.

Figure 1:
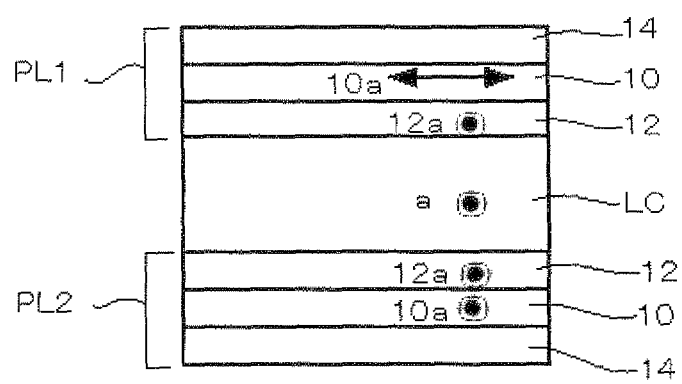
FIG. 1 is a schematic cross-sectional view of one example of an IPS-mode liquid-crystal display device of the invention.

The meanings of the numerical references and signs in the drawings are as follows:

| | |
|---|---|
| 10 | Polarizing element |
| 10a | Absorption axis |
| 12 | Acryl-base polymer film (acryl-base polymer of the invention) |
| 14 | Protective film |
| 14' | Protective film (biaxial film) |
| 12a, 14a, 14'a, 16a | Slow axis |
| 16 | Polymer film |
| 18 | Positive C-plate |
| a | Rubbing axis in rubbing treatment applied to the substrate of liquid-crystal cell LC |
| LC | IPS-mode liquid-crystal cell |
| PL1 | Polarizing plate on panel side |
| PL2 | Polarizing plate on backlight side |

PREFERRED EMBODIMENT OF THE INVENTION

The present invention will be detailed below. Note that, in this patent specification, any numerical expression in a style of " . . . to . . . " will be used to indicate a range including the lower and upper limits represented by the numerals given before and after "to", respectively.

In this description, Re and Rth are at a wavelength of 550 nm unless otherwise specifically indicated. Also in this description, the range of the numerical data and the numerical range should be so interpreted as to indicate the numerical data and the numerical range that include the error range generally acceptable for liquid-crystal display devices and their constitutive components. The same shall apply to the relationship ("parallel to", "perpendicular to", etc.) between optical axes (polarization axes of polarizing elements, slow axes of optically-anisotropic layers, etc.), and also to and the angle between those axes.

1. Optical compensation Film:

The invention relates to an optical compensation film for IPS-mode or FFS-mode liquid-crystal display devices having the tilt angle $\beta[°]$ of the main axis not equal to zero, namely, $\beta \neq 0$, and having retardation along the thickness direction at a wavelength of 550 nm, Rth(550), not equal to 0, namely, Rth(550)$\neq$0. The optical compensation film of the invention satisfies the above-mentioned predetermined optical characteristics, therefore contributing toward solving the problem of light leakage in oblique directions of IPS-mode, FFS-mode or the like horizontal alignment-mode liquid-crystal display devices in the black state. More concretely, this is as described below. In an IPS-mode, FFS-mode or the like horizontal alignment-mode liquid-crystal display device, the liquid-crystal molecules are horizontally aligned along the alignment control direction (generally the direction of the rubbing axis) of the alignment film formed on the surface of the substrate in no application of driving voltage thereto, and in this condition, therefore, the device is in the black state. However, the device has a pretilt angle in some degree, and in this, therefore, the liquid-crystal molecules are not aligned completely horizontally. Accordingly, when the display panel of the device is observed at oblique angles shifted in the vertical direction from the normal line direction, then asymmetric light leakage may be caused by the asymmetricity of the alignment of the liquid-crystal molecules in the device. The optical compensation film of the invention satisfies the tilt angle $\beta$ of the main axis, $\beta \neq 0$, therefore contributing toward solving the problem of the asymmetricity in light leakage in the black state to be caused by the pretilt angle of an IPS-mode or FFS-mode liquid-crystal cell. As a result, even though some light leakage occurs in an IPS-mode or FFS-mode liquid-crystal display device in the black state, the degree of light leakage is nearly symmetric in the vertical direction of the display panel, and therefore the device can realize more ideal black state.

In the description, Re(λ) (unit: nm) and Rth(λ) (unit: nm) each indicate retardation in plane and retardation along the thickness direction of a sample, an optically anisotropic layer, a film, a lamination or the like, at a wavelength λ.

Re(λ) is measured by applying a light having a wavelength of λ nm in the normal direction of the film, using KOBRA-21ADH or WR (by Oji Scientific Instruments).

The selectivity of the measurement wavelength λ nm may be conducted by a manual exchange of a wavelength-filter, a program conversion of a measurement wavelength value or the like.

When a film to be tested is represented by an uniaxial or biaxial refractive index ellipsoid, then its Rth(λ) is calculate according to the method mentioned below.

With the in-plane slow axis (determined by KOBRA 21ADH or WR) taken as the inclination axis (rotation axis) of the film (in case where the film has no slow axis, the rotation axis of the film may be in any in-plane direction of the film), Re(λ) of the film is measured at 6 points in all thereof, up to +50° relative to the normal direction of the film at intervals of 10°, by applying a light having a wavelength of λ nm from the inclined direction of the film.

With the in-plane slow axis from the normal direction taken as the rotation axis thereof, when the film has a zero retardation value at a certain inclination angle, then the symbol of the retardation value of the film at an inclination angle larger than that inclination angle is changed to a negative one, and then applied to KOBRA 21ADH or WR for computation.

With the slow axis taken as the inclination axis (rotation axis) (in case where the film has no slow axis, the rotation axis of the film may be in any in-plane direction of the film), the retardation values of the film are measured in any inclined two directions; and based on the data and the mean refractive index and the inputted film thickness, Rth may be calculated according to the following formulae (A) and (B):

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (A)$$

$$Rth = \left[\frac{nx + ny}{2} - nz\right] \times d \quad (B)$$

wherein Re(θ) means the retardation value of the film in the direction inclined by an angle θ from the normal direction; nx means the in-plane refractive index of the film in the slow axis direction; ny means the in-plane refractive index of the film in the direction vertical to nx; nz means the refractive index of the film vertical to nx and ny; and d is a thickness of the film.

When the film to be tested can not be represented by a monoaxial or biaxial index ellipsoid, or that is, when the film does not have an optical axis, then its Rth(λ) may be calculated according to the method mentioned below.

With the in-plane slow axis (determined by KOBRA 21ADH or WR) taken as the inclination axis (rotation axis) of the film, Re(λ) of the film is measured at 11 points in all thereof, from −50° to +50° relative to the normal direction of the film at intervals of 10°, by applying a light having a wavelength of λ nm from the inclined direction of the film. Based on the thus-determined retardation data of Re(λ), the mean refractive index and the inputted film thickness, Rth(λ) of the film is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

In this description, Re, Rth and the refractive index are at a wavelength of 550 nm unless otherwise specifically indicated for the wavelength for their measurement.

In this description, R[β] is the minimum value of the above-mentioned Re(θ), and β=θ.

From the viewpoint of solving the problem of the asymmetricity in light leakage of an IPS-mode or. FFS-mode liquid-crystal display device in the black state, the tile angle β of the main axis of the optical compensation film of the invention is preferably |β|≤35°, more preferably |β|≤30°.

Also from the viewpoint of solving the problem of the light leakage in oblique directions in the black state, the optical compensation film of the invention has Re(550) of preferably from −10 nm to 10 nm, or preferably from −7 nm to 7 nm, even more preferably from −5 nm to 5 nm. From the same viewpoint, the optical compensation film of the invention has Rth(550) of preferably from −30 nm to 30 nm (but Rth(550) ≠0), ore preferably from −20 nm to 20 nm, even more preferably from −15 nm to 15 nm.

From the viewpoint of solving the problem of color shift in oblique directions in the black state, the wavelength dispersion characteristics of Re of the optical compensation film of the invention are preferably |Re(630)−Re(450)| of at most 1.5 nm, more preferably at most 1 nm. From the same viewpoint, the wavelength dispersion characteristics of Rth of the optical compensation film of the invention are preferably |Rth(630)−Rth(450)| of at most 4 nm, more preferably at most 2 nm.

One embodiment of the optical compensation film of the invention is an acryl-base polymer film of which the tile angle β[°] of the main axis is β≠0 and |β|≤45, and which has Re (550) of from −10 nm to 10 nm, Rth(550) of from −30 nm to 30 nm, wavelength dispersion characteristics of the in-plane retardation Re, |Re(630)−Re(450)| of at most 1.5 nm, and wavelength dispersion characteristics of the thickness-direction retardation Rth, |Rth(630)−Rth(450)| of at most 4 nm.

The thickness of the optical compensation film (e.g., acryl-base polymer film) just formed but unstretched is preferably from 20 μm to 200 μm, more preferably from 30 μm to 150 μm, even more preferably from 40 μm to 100 μm.

Preferably, the thickness unevenness of the film is from 0% to 3% both in the x-axis direction and in the y-axis direction, more preferably from 0% to 2%, even more preferably from 0% to 1%.

The optical compensation film of the invention may be laminated with a C-plate or a biaxial film, in which the C-plate and the biaxial film may have a tilt angle. In this, β of the C-plate and the biaxial plate is preferably |β|≤35°.

1.-1 Material of Optical Compensation Film:

One embodiment of the optical compensation film of the invention is an acryl-base polymer film containing, as the main ingredient thereof, at least one polymer prepared through polymerization of at least one monomer of acrylic acid, methacrylic acid or their derivatives (hereinafter this may be referred to as "(meth)acrylic acid monomer") either singly or as combined with any other monomer (hereinafter this may be referred to as "acryl-base polymer"). The derivatives of acrylic acid and methacrylic acid ((meth)acrylic acid) include methacrylates and acrylates. The methacrylates include cyclohexyl methacrylate, t-butylcyclohexyl methacrylate, methyl methacrylate, etc. The acrylates include methyl acrylate, ethyl acrylate, butyl acrylate, isopropyl acrylate, 2-ethylhexyl acrylate, etc.

Examples of other (meth)acrylic acid derivative include the compounds represented by formula (1).

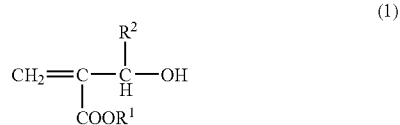

(1)

In the formula, $R^1$ and $R^2$ each independently respect a hydrogen atom or $C_{1-20}$ organic group. Examples of the $C_{1-20}$ organic group include linear, branched or cyclic $C_{1-20}$ alkyls.

Examples of the (meta)acryl-base monomer, which can be used as a material of the acryl-base polymer used for preparing the optical compensation film, include methyl(meth)acrylate, ethyl(meth)acrylate, n-propyl(meth)acrylate, n-butyl(meth)acrylate, tert-butyl(meth)acrylate, n-hexyl(meth)acrylate, 2-chloroethyl(meth)acrylate, 2-hydroxyethyl(meth)acrylate, 3-hydroxypropyl(meth)acrylate, 2,3,4,5,6-pentahydroxyethyl(meth)acrylate, and 2,3,4,5-tetrahydroxypentyl(meth)acrylate. In terms of the thermal stability, preferably, methyl(meth)acrylate (referred to as "MMA" hereinunder) is at least used.

The acryl-base polymer to be used as a material of the optical compensation film of the invention may be a homopolymer or co-polymer. In terms of increasing the glass-transition temperature (referred to as "Tg hereinunder), the copolymers of any (meth)aryl-base monomer and another polymerizable monomer are preferable.

Examples of another polymerizable monomer to be used in combination of any (meth)aryl-base monomer for preparing the acyl-base polymer include aromatic vinyl compounds such as styrene, alkyl-substituted styrenes (such as o-methyl styrene, p-methyl styrene, 2,4-dimethyl styrene, o-ethyl styrene, p-ethyl styrene and p-tert-butyl styrene) and α-alkyl-substituted styrenes (such as α-methyl styrene and α-methyl-p-methyl styrene); cyanidation vinyl compounds acrylonitrile and methacrylonitrile; maleimides such as N-phenyl maleimide and N-cyclohexyl maleimide; unsaturated carboxylic acid anhydrides such as lactone ring unit, glutaric acid anhydride unit and maleic acid anhydride; unsaturated acids such as maleic acid; and glutarimide unit. Among these, in terms of the heat resistance, N-substituted maleimides such as N-phenyl maleimide, N-cyclohexyl maleimide and N-methyl maleimide; lactone ring unit, glutaric acid anhydride unit, maleic acid anhydride unit and glutarimide unit are preferable; and in terms of the high Tg, lactone ting unit, maleic acid unit and glutaric acid unit are preferable.

Lactone Ring Unit:

Having the lactone ring unit in the molecular chain thereof (or the main chain thereof if it is introduced into the main skeleton thereof), the copolymer, the acryl-base polymer, may show high heat resistance and have a high Tg, which is preferable. In terms of reducing bubbles and silver streak, the cyclization-condensation reactivity to give a lactone ring structure is preferably high sufficiently.

Examples of the lactone ring unit which can be used in the invention include, but are not limited to, those described in JP-A-2007-297615, 2007-63541, 2007-70607, 2007-100044, 2007-254726, 2007-254727, 2007-261265, 2007-293272, 2007-297619, 2007-316366, 2008-9378 and 2008-76764. They may be used alone respectively or in combination with others.

The lactone ring in the main chain is preferably 4- to 8-membered ring. In terms of stability of the structure, 5- or 6-membered rings are preferable, and 6-membered rings are more preferable. Examples of the 6-membered lactone ring unit in the main chain include the structures represented by formula (2) shown below and those described in JP-A-2004-168882. In terms of obtaining the high degrees of polymerization in preparing the polymers before being subjected to introduction of the lactone ring in the main chain, obtaining easily the high productivity of polymers having the lactone ring unit in a high ratio, and obtaining the good copolymerization of (meth)acrylates such as methyl methacrylate, the lactone ring unit represented by formula (2) is preferable.

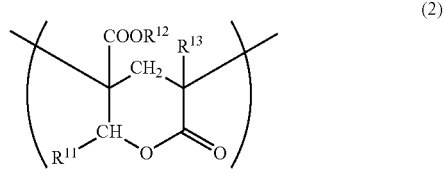

(2)

In formula (2), $R^{11}$ to $R^{13}$ each independently represent a hydrogen atom or $C_{1-20}$ organic group.

There is no limitation on the $C_{1-20}$ organic group, and examples of the $C_{1-20}$ organic group include linear or branched alkyl, linear or branched alkylenes, aryls, —OAc and —CN. The $C_{1-20}$ organic group may have an oxygen atom. The number of the carbon atoms in each of $R^{11}$ to $R^{13}$ is preferably from 1 to 10, and more preferably from 1 to 5.

The acryl-base polymer having a lactone ring unit may be prepared according to any process. One preferable example of the process is as follows. A polymer, having a hydroxy and an ester, is prepared according to any polymerization step, and, after that, is subjected to a heat treatment to form a lactone ring unit therein.

Maleic Acid Anhydride Unit:

Having the maleic acid anhydride unit in the molecular chain thereof (or the main chain thereof if it is introduced into the main skeleton thereof), the copolymer, the acryl-base polymer, may show high heat resistance and have a high Tg, which is preferable.

There is no limitation on the maleic acid anhydride unit which can be used in the invention. Examples of the maleic acid anhydride include those described in JP-A-2007-113109, 2003-292714, 6-279546, 2007-51233, 2001-270905, 2002-167694, 2000-302988, 2007-113110 and 2007-11565; and maleic acid-base modified polymers. Among these, the polymers described in JP-A-2007-113109 and maleic acid modified MAS polymers (methyl methacrylate-acrylonitrile-styrene copolymers) such as "DEL PET 980N" by ASAHI CHEMICALS are preferable. These may be used alone respectively or in combination with the other(s). The acryl-base polymer having a maleic acid unit may be prepared according to any process.

There is no limitation on the acryl-base polymers having the maleic acid unit. Examples of the acryl-base polymers having the maleic acid include (anhydride) maleic acid modified MA polymers, (anhydride) maleic acid modified MAS polymers (methyl methacrylate-acrylonitrile-styrene copolymers), (anhydride)maleic acid modified MBS polymers, (anhydride)maleic acid modified AS polymers, (anhydride) maleic acid modified AA polymers, (anhydride) maleic acid modified ABS polymers, ethylene-maleic acid anhydride copolymers, ethylene-(meth)acrylate-maleic acid anhydride copolymers and maleic acid anhydride grafted poly propylene.

Examples of the maleic acid anhydride unit include the group represented by formula (3).

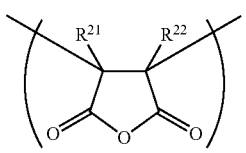

(3)

In formula (3), $R^{21}$ and $R^{22}$ each independently represent a hydrogen atom or $C_{1-20}$ organic group.

There is no limitation on the $C_{1-20}$ organic group, and examples of the $C_{1-20}$ organic group include linear or branched alkyl, linear or branched alkylenes, aryls, —OAc and —CN. The $C_{1-20}$ organic group may have an oxygen atom. The number of the carbon atoms in each of $R^{21}$ and $R^{22}$ is preferably from 1 to 10, and more preferably from 1 to 5.

In terms of controlling intrinsic birefringence, when $R^{21}$ and $R^{22}$ contains hydrogen atom(s) therein respectively, the polymer preferably contains further unit derived from any other monomer(s). Examples of such acryl-base polymers, having units derived from the three or more monomers, include methyl-methacrylate-maleic acid anhydride-styrene copolymers.

Glutaric Acid Anhydride Unit:

Having the glutaric acid anhydride unit in the molecular chain thereof (or the main chain thereof if it is introduced into the main skeleton thereof), the copolymer, the acryl-base polymer, may show high heat resistance and have a high Tg, which is preferable.

There is no limitation on the glutaric acid anhydride unit which can be used in the invention. Examples of the glutaric acid anhydride unit include those described in JP-A-2006-241263, 2004-70290, 2004-70296, 2004-126546, 2004-163924, 2004-291302, 2004-292812, 2005-314534, 2005-326613, 2005-331728, 2006-131898, 2006-134872, 2006-206881, 2006-241197, 2006-283013, 2007-118266, 2007-176982, 2007-178504, 2007-197703, 2008-74918 and WO 2005/105918. Among these, those described in JP-A-2008-74918 are preferable. These may be used alone respectively or in combination with the other(s).

Examples of the glutaric acid anhydride unit include the group represented by formula (4).

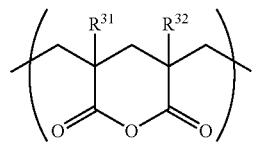

(4)

In formula (3), $R^{31}$ and $R^{32}$ each independently represent a hydrogen atom or $C_{1-10}$ organic group.

The number of carbon atoms in each of $R^{31}$ and $R^{32}$ is preferably from 1 to 10, and more preferably from 1 to 10.

The acryl-base polymer having a glutaric acid anhydride unit may be prepared according to any process. One preferable example of the process is as follows. Copolymerization of unsaturated carboxylic acid anhydride monomer, which gives a glutaric acid anhydride unit, and alkyl unsaturated carboxylate monomer is carried out to form a copolymer. After that, the copolymer is subjected to a dialcohol or dehydration reaction under heat in the presence or in the absence of catalyst, to thereby allow an intramolecular cyclization.

Other Co-Polymerizable Ingredient(s):

The acryl-base polymer may contain other unit(s) derived from the monomer(s) capable of copolymerization in the amount as not losing the heat-resistance. Examples of the other monomer capable of copolymerization include aromatic vinyl compounds such as styrene, α-methyl styrene, o-methyl styrene, p-methyl styrene, o-ethyl styrene, p-ethyl styrene and p-t-butyl styrene; cyanidation vinyl compounds acrylonitrile, methacrylonitrile and ethacrylonitrile; Acryl glycidyl ether, styrene-p-glycidyl ether, p-glycidyl styrene, itaconic acid anhydride, N-methyl maleimide, N-ethyl maleimide, N-cyclohexyl maleimide, N-phenyl maleimide, acrylamide, methacrylamide, N-methyl acrylamide, butoxymethyl acrylamide, N-propyl methacrylamide, aminoethyl acrylate, propyl aminoethyl acrylate, dimethyl aminoethyl methacrylate, ethyl aminopropyl methacrylate, phenyl aminoethyl methacrylate, cyclohexyl aminoethyl methacrylate, N-vinyl diethylamine, N-acetyl vinyl amine, allyl amine, methallyl amine, N-methyl allylamine, p-amino styrene, 2-isopropenyl-oxazoline, 2-vinyl-oxazoline, 2-acroyl-oxazoline, 2-styryl-oxazoline, nitrile-base monomers such as acrylonitrile; vinyl esters such as vinyl acetate; and glutarimide units.

Preferable examples of the acryl-base polymer include acryl-base polymers having at least one unit selected from the group consisting of a lactone unit, maleic anhydride unit and glutaric anhydride unit along with the repeated unit derived from (meth)acrylic acid ester. More preferable examples of the acryl-base polymer include acryl-base polymers having at least one unit selected from the group consisting of a lactone unit or maleic anhydride unit along with the repeated unit derived from (meth)acrylic acid ester.

The acryl-base polymer preferably contains the MMA unit (monomer) in the amount of 30% or more by mole, and more preferably from 30 to 80% by mole. The acryl-base polymer preferably contains at least one unit selected from the group consisting of a lactone unit, maleic anhydride unit and glutaric anhydride unit along with the repeated unit of MMA. The ratio of at least one unit selected from the group consisting of a lactone unit, maleic anhydride unit and glutaric anhydride unit is preferably from 5 to 60% by mole, and more preferably from 10 to 50% by mole, with respect to the total moles of all monomers in the acryl-base polymer.

The Tg of the acryl-base polymer is preferably from 105 to 170 degrees Celsius, more preferably from 110 to 160 degrees Celsius, and much more preferably from 115 to 150 degrees Celsius. The melt viscosity of the acryl-base polymer is preferably from 500 Pa·s to 10000 Pa·s, more preferably from 800 Pa·s to 7000 Pa·s, much more preferably from 800 Pa·s to 7000 Pa·s, and even much more preferably from 1000 Pa·s to 5000 Pa·s, at 230 degrees Celsius under being applied 1% distortion with 1 Hz.

The weight-averaged molecular weight of the acryl-base polymer is preferably from 1,000 to 2,000,000, more preferably from 5,000 to 1,000,000, much more preferably from 10,000 to 500,000, and even much more preferably from 50,000 to 500,000.

The optical compensation film of the invention may be formed of a polymer film containing a thermoplastic polymer as a main ingredient other than the acryl-base polymer film. Examples of the thermoplastic polymer include cycloolefin-base polymers, cellulose acylates, polyesters and polycarbonates. When the film is prepared according to a melt-extrusion method, the material may be selected form the materials showing good film-forming properties for the melt-extrusion method, and in this regard, cycloolefin-base polymers and cellulose acylates are preferable. These thermoplastic polymers may be used alone respectively or in combination with the other polymer(s). Among these, cellulose acylates and cycloolefin-base polymers which are prepared according to an addition polymerization are preferable. In the description, the term "cellulose acylate-base film" is used for any films containing at least one cellulose acylate as a main ingredient; and the term "cycloolefin-base polymer" is used for any films containing at least one cycloolefin base polymer (copolymer or homopolymer) as a main ingredient.

Examples of the cycloolefin-base copolymer include norbornene-base polymers. They may be prepared according to a ring-opening polymerization or addition polymerization.

Examples of the addition polymerization or the polymers obtained by the method include those described in Japanese patent Nos. 3517471, 3559360, 3867178, 3871721, 3907908 and 3945598; JP-A-2005-527696, 2006-28993, and 2006-11361; and WO20064004376 and WO20064030797. Among these, those described in Japanese patent No. 3517471 are preferable.

Examples of the ring-opening polymerization or the polymers obtained by the method include those described in WO98/14499, Japanese patent Nos. 3060532, 3220478, 3273046, 3404027, 3428176, 3687231, 3873934 and 3912159. Among these, those described in WO98/14499 and Japanese patent No. 3060532 are preferable.

Among the cycloolefin-base polymers, those obtained according to an addition polymerization are preferable. Any commercially available polymers may be used; and examples of the polymer include "TOPAS #6013" (by Polyplastics) which may prevent gel from occurring in the extrusion step.

Examples of the cellulose acylate include any cellulose acylate in which three hydroxys in a cellulose unit are at least partially replaced with an acyl. The acyl is preferably a $C_{3-22}$ acyl, and may be an aliphatic or aromatic acyl. Among these, cellulose acylates having an aliphatic acyl are preferable; cellulose acylates having a $C_{3-7}$ aliphatic acyl are more preferable; and cellulose acylates having s $C_{3-6}$ acyl are much more preferable. The cellulose acylate may have plural acyls in each molecule. Preferable examples of the acyl include acetyl, propionyl, butyryl, pentanoyl and hexanoyl. Among these, more preferable are any cellulose acylates having one or more selected from the group consisting of acetyl, propionyl and butyryl; and much more preferable are any cellulose acylates having both of acetyl and propionyl, referred to as CAP. CAP can be easily prepared, and is stable during the extrusion step.

The optical compensation film of the invention contains at least one additive along with the main ingredient, polymer material such as acryl-base polymer. Examples of the additive which can be used in the invention include plasticizers, stabilizers, mat agents, UV absorbing agents, IR absorbing agents and retardation controlling agents. When the film is prepared according to a melt-extrusion process, the additive may be added anytime in the process. For example, it may be added to the film finally in the process The additives which can be used in the invention will be described in detail.

Stabilizer:

The optical compensation film of the invention may contain at least one stabilizer. The stabilizer is effective for anti-oxidation of film-constituting ingredients, for trapping the acids formed through decomposition, and for retarding or inhibiting the radical group-caused decomposition under light or heat. The stabilizer is effective for inhibiting degradation such as discoloration or molecular weight reduction to be caused by various types of decompositions including decomposition not as yet clarified, and also inhibiting formation of volatile ingredients. Preferably, the stabilizer is added before or during hot melting of thermoplastic polymer. The stabilizer is required to be still effective to exhibit its function, without being decomposed at the polymer melting temperature at which the polymer is formed into a film.

Typical example of the stabilizer includes phenol-type stabilizers, phosphite-type stabilizers, thioether-type stabilizers, amine-type stabilizers, epoxy-type stabilizers, lactone-type stabilizers, amine-type stabilizers, metal inactivators (tin-type stabilizers), etc. These are described in JP-A 3-199201, 5-1907073, 5-194789, 5-271471, and 6-107854. Preferably, at lest one of phenol-type and phosphite-type stabilizers is used in the invention.

One or more of the above-mentioned stabilizers may be used herein either singly or as combined. Not detracting from the object of the invention, the amount of the stabilizer to be in the film may be suitably determined. Preferably, the amount of the stabilizer to be added is from 0.001 to 5% by mass relative to the mass of the thermoplastic polymer, more preferably from 0.005 to 3% by mass, even more preferably from 0.01 to 0.8% by mass.

Preferable examples of the stabilizer include phenol-type stabilizers. Phenol-type stabilizers may be used for stabilizing the polymer material during the thermal melting. Exampled of the phenol-type stabilizer include 2,6-dialkyl phenol derivatives as described in U.S. Pat. No. 4,839,405, 12-14 columns. More preferred are those having a molecular weight of at least 500. Preferred phenol-type stabilizers include hindered phenol-type stabilizers. These materials are readily available as commercial products, and are sold, for example, by the following manufacturers. Ciba Specialty Chemicals provides commercial products of Irganox 1076, Irganox 1010, Irganox 3113, Irganox 245, Irganox 1135, Irganox 1330, Irganox 259, Irganox 565, Irganox 1035, Irganox 1098, Irganox 1425WL. Asahi Denka Kogyo provides commercial products of Adekastab AO-50, Adekastab AO-60, Adekastab AO-20, Adekastab AO-70, Adekastab AO-80. Sumitomo Chemical provides commercial products Sumilizer BP-76, Sumilizer BP-101, Sumilizer GA-80. Shipro Chemical provides commercial products Seenox 326M, Seenox 336B.

As phosphite-type stabilizers, more preferred are the compounds described in JP-A 2004-182979, paragraphs [0023]-

[0039]. Specific examples of phosphite-type stabilizers include compounds described in JP-A 51-70316, 10-306175, 57-78431, 54-157159, 55-13765. As other stabilizers, preferred are the materials described in detail in Hatsumei Kyokai Disclosure Bulletin (No. 2001-1745, issued on Mar. 15, 2001, by Hatsumei Kyokai), pp. 17-22.

The phosphite-type stabilizers are preferably high-molecular ones for securing the stability thereof at high temperatures, having a molecular weight of at least 500, more preferably at least 550, even more preferably at least 600. Also preferably, the stabilizers have an aromatic ester group as at least one substituent therein. Also preferably, the phosphite-type stabilizers are triesters, more preferably not mixed with impurities of phosphoric acid, monoester or diester. In case where the stabilizer contains such impurities, preferably, the content of the impurities is at most 5% by mass, more preferably at most 3% by mass, even more preferably at most 2% by mass. For the stabilizers of the type, usable are the compounds described in JP-A 2004-182979, [0023] to [0039], and also usable are the compounds described in JP-A 51-70316, 10-306175, 57-78431, 54-157159, and 55-13765. Preferred examples of phosphite-type stabilizers are mentioned below. However, the phosphite-type stabilizers for use in the invention should not be limited to these.

Asahi Denka provides commercial products of Adekastab 1178, 2112, PEP-8, PEP-24G, PEP-36G, HP-10; and Clariant provides commercial products of Sandostab P-EPQ.

Also preferred for use herein are stabilizers having both phenol and phosphite moieties in one molecule. The compounds are described in detail in JP-A 10-273494, and their examples are, but not limited thereto, within the scope of the examples of the stabilizers mentioned in the above. Typically, Sumitomo Chemical provides commercial products of Sumilizer GP.

Preferable examples of the stabilizer include thioether-base stabilizers. The molecular weight of the thioether-base stabilizer is preferably equal to or more than 500. Any known thioether-base stabilizers can be used. They are commercially available as Sumitomo Chemical's products of Sumilizer TPL, TPM, TPS, TDP. Asahi Denka Kogyo provides commercial products of Adekastab AO-412S.

Preferable examples of the stabilizer include epoxy-base stabilizers. The epoxy-base stabilizer is preferably selected form the compounds having an aliphatic, aromatic, alicyclic, aromatic-aliphatic, or heterocyclic structure and the side chains thereof having an epoxy. The epoxy group may connect to the residue of any molecule via an ether or ester bond as a glycidyl, or exist as a moiety of N-glycidyl derivatives such as heterocyclic amine, amide or imide. Such epoxy compounds are commercially available. Examples of the compound are described in JP-A-11-189706, [0096] to [0112]. Such epoxy compounds are available as products of Adekastab O-130P and O-180A (by Asahi Denka Kogyo).

Preferable examples of the stabilizer include tin-base stabilizers. Any known tin-base stabilizer can be used. Preferable examples of the tin-base stabilizer include octyl thin maleate polymers, monostearyl thin tris(isooctylthioglycolate) and dibutyl thin dilaurate.

In the description, the term "stabilizer" means a concept encompassing any acid-trapping agents and any light stabilizers. The stabilizer(s) capable of mainly trapping any acid, acid-trapping agent(s), the stabilizer(s) capable of mainly improving the light stabilization, light stabilizer(s), or other stabilizer(s) may be used. Among these, phenol-base stabilizers capable of trapping radicals are preferable.

Acid-Trapping Agent:

The decomposition of the materials in the acryl-base polymers may be promoted by acid under the high temperature, and therefore, an acid-trapping agent is preferably added to the film.

The acid-trapping agent is a gent capable of achieving inactivation of the acid via reaction with the acid; and there is no limitation on the acid-trapping agent. Preferable examples of the acid-trapping agent include epoxy compounds described in U.S. Pat. No. 4,137,201. Such epoxy compounds are known as an acid-trapping agent in the technical field. Examples of the epoxy compound include diglycidyl ethers of various polyglycols such as diglycidyl ethers of glycerol or polyglycol which are derived by condensation of one mole of glycol and about 8-40 moles of ethylene oxide; metal epoxy compounds which have been used along with vinyl chloride polymers; condensation products of epoxidation ethers; diglycidyl ethers of bisphenol A (or, that is, 4,4'-dihydroxy diphenyl dimethyl ethane); esters of epoxidation unsaturated aliphatic acids such as $C_{2-4}$ alkyl esters of $C_{2-22}$ aliphatic acids (for example, butyl epoxy stearate); and triglycerides of various epoxidation long-chain aliphatic acids such as epoxidation plant oil and other unsaturated natural oil (one of their typical examples is epoxidation soy oil, they may be referred to as epoxidation natural triglycerides or unsaturated natural acids, and these aliphatic acids may have 12-22 of carbon atoms.

"EPON 815c", which is a commercially available epoxy resin having epoxy groups, and condensation products of epoxidation ether oligomers are especially preferable.

Examples of the acid-trapping agent other than those described above include oxetane compounds, oxazoline compounds, alkali earth salts of organic acids; alkali earth acetylacetonate complexes; and those described in JP-A-5-194788, paragraphs 68-105.

The acid-trapping agent may be called as other names such as an acid-capturing agent, acid scavenger or the like, but any agents may be used in the invention regardless of the name.

The amount of the acid-trapping agent is preferably from 0.001% by mass to 5% by mass, more preferably from 0.005 to 3% by mass, and much more preferably from 0.01 to 2% by mass with respect to the mass of the polymer material.

Light Stabilizer:

The optical compensation film (for example, acryl-base polymer film) of the invention may contain at least one light stabilizer. Examples of the light stabilizer include hindered amine light stabilizer (HALS). And specific examples thereof include 2,2,6,6-tetrakis alkyl piperidine compounds, acid-adducts thereof, and metal complexes thereof; which are described in U.S. Pat. No. 4,619,956, columns 5-11, and U.S. Pat. No. 4,839,405, columns 3-5. Theses are commercially available as Asahi Denka Kogyo's products such as Adekastab LA-57, LA-52, LA-67, LA-62 and LA-77 or as Chiba Specialty Chemicals's products such as TINUVIN 765 and 144.

These hindered amine light stabilizers may be used alone respectively or in combination with other(s). The hindered amine light stabilizer may be used along with other additive(s) such as plasticizer, acid-trapping agent and UV absorbing agent. Or the additive having a residue of the hindered amine light stabilizer therein may be also used. The amount of the light stabilizer is preferably from 0.01 to 20 parts by mass, more preferably from 0.02 to 15 parts by mass and much more preferably from 0.05 to 10 parts by mass with respect to 100 parts of the polymer material.

UV Absorbing Agent:

The optical compensation film (for example, acryl-base polymer film) of the invention may contain one or more UV absorbing agent. In terms of the durability, the compounds capable of almost absorbing UV light having a wavelength not longer than 380 nm are preferable; and in terms of displaying quality, the compounds capable of hardly absorbing UV light having a wavelength not shorter than 400 nm are preferable. Examples of the UV absorbent include oxybenzophenone compounds, benzotriazole compounds, salicylate compounds, benzophenone compounds, cyanoacrylate compounds, and nickel complex compounds; and preferred are benzotriazole compounds and benzophenone compounds. Among theses, especially, preferred are benzotriazole compounds causing little coloration. Preferable examples of these UV absorbing agents include those described in JP-A-60-235852, 3-199201, 5-1907073, 5-194789, 5-271471, 6-107854, 6-118233, 6-148430, 7-11056, 7-11055, 7-11056, 8-29619, 8-239509, and 2000-204173. The amount of the UV absorbing agent is preferably 0.01 to 2% by mass, and more preferably from 0.01 to 1.5% by mass with respect to the mass of the melt to be used for preparing the film.

As the UV absorbing agent which can be used in the invention, polymers capable of absorbing UV light described in JP-A-6-148430 and any polymers containing UV absorbing monomers. The weight-averaged molecular weight of the polymer derived from the UV absorbing monomer is preferably from 2000 to 30000, and more preferably from 5000 to 20000.

The ratio of the UV absorbing monomer in the polymer is preferably from 1 to 70% by mass and more preferably from 5 to 60% by mass.

Examples of the commercially available UV absorbing monomer include 1-(2-benzotriazole)-2-hydroxy-5-(2-vinyloxy carbonyl ethyl)benzene, RUVA-93 by Otsuka Chemical Co. ltd., which is 1-(2-benzotriazole)-2-hydroxy-5-(2-methacryloyloxy ethyl)benzene, and analogous compounds thereof. Any homopolymers of these monomers and any copolymers of the monomers and the other monomers may be preferably used. Examples of the commercially available UV absorbing polymer include PUVA-30M by Otsuka Chemical Co. ltd. The UV absorbing agent may be used alone respectively or in combination with other(s).

Examples of the commercially available UV absorbing agent are as follows:

As an benzotriazole-base agent, TINUBIN P (by Chiba•Specialty•Chemicals), TINUBIN 234 (by Chiba•Specialty•Chemicals), TINUBIN 320 (by Chiba•Specialty•Chemicals), TINUBIN 326 (by Chiba•Specialty•Chemicals), TINUBIN 327 (by Chiba•Specialty•Chemicals), TINUBIN 328 (by Chiba•Specialty•Chemicals), Sumisorbe 340 (by Sumitomo Chemical) and Adekastabe LA-31 (by Asahi Denka Kogyo) are exemplified. As a benzophenone-base UV absorbing agent, SEESORBE 100 (by SHIPRO KASEI KAISHA LTD.), SEESORBE 101 (by SHIPRO KASEI KAISHA LTD.), SEESORBE 101S (by SHIPRO KASEI KAISHA LTD.), SEESORBE 102 (by SHIPRO KASEI KAISHA LTD.), SEESORBE 103 (by SHIPRO KASEI KAISHA LTD.), Adekastabe LA-51 (by Asahi Denka Kogyo), CHEMISORPE111 (by CHEMIPRO KASEI KAISHA ltd.) and UVINUL D-49 (by BASF) are exemplified. As a salicylic acid-base UV absorbing agent, SEESORBE 201 (by SHIPRO KASEI KAISHA LTD.) and SEESORBE 201 (by SHIPRO KASEI KAISHA LTD.) are exemplified. As cyano acrylate-base UV absorbing agent, SEESORBE 501 (by SHIPRO KASEI KAISHA LTD.) and UVINUL N-539 (by BASF) are exemplified.

The preferable range of the amount of the UV absorbing agent or the UV absorbing polymer may be varied depending on the types or conditions in use of the material. Generally, the amount of the UV absorbing agent is preferably from 0.2 to 3.0 g per 1 $m^2$ of the film, more preferably from 0.4 to 2.0 g per 1 $m^2$ of the film, and much more preferably from 0.5 to 1.5 per 1 $m^2$ of the film. The amount of the UV absorbing polymer is preferably from 0.6 to 9.0 g per 1 $m^2$ of the film, more preferably from 1.2 to 6.0 g per 1 $m^2$ of the film, and much more preferably from 1.5 to 3.0 per 1 $m^2$ of the film.

Plasticizer:

The optical compensation film (for example, acryl-base polymer film) of the invention may contain a plasticizer. Adding a plasticizer to the film is favorable from the viewpoint of film reformation, for example, for improving the mechanical properties of the film, imparting flexibility to the film, imparting water absorbability to the film or reducing the moisture permeability of the film. In case where the film of the invention is produced according to a melt formation method, a plasticizer may be added to the film for the purpose of depressing the melting temperature of the film-constituting material through plasticizer addition thereto, than the glass transition temperature of the thermoplastic polymer used, or for the purpose of reducing the viscosity of the polymer composition at the same heating temperature than that of the thermoplastic polymer to which the plasticizer is not added.

For example, for the film of the invention, preferably used are plasticizers selected from phosphate ester-type plasticizers, phthalic acid ester-type plasticizers, trimellic acid ester-type plasticizers, pyromellic ester type plasticizers, polyfunctional alcohol ester-type plasticizers, glycolate-typ plasticizers, citric acid ester-type plasticizers, fatty aid ester-type plasticizers, carboxylic acid ester-type plasticizers, and polyester-type plasticizers. Preferable are stabilizers other than phosphate ester-type plasticizers such as polyfunctional alcohol ester-type plasticizers, polyester-type plasticizers, citric acid ester-type plasticizers and phthalic acid ester-type plasticizers. In addition, also preferably used are polymers produced through polymerization of ethylenic unsaturated monomers and having a weight-average molecular weight of from 500 to 10000, as in JP-A 2003-12859, as well as acrylic polymers, acrylic polymers having an aromatic ring in the side branches, and acrylic polymers having a cyclohexyl group in the side branches.

The plasticizer may be liquid or solid, and colorless plasticizers are preferable. Preferably, the plasticizer is thermally stable at a high temperature, and the temperature of starting decomposition of the agent is preferably equal to or higher than 150 degrees Celsius, and more preferably equal to or higher than 200 degrees Celsius. The amount of the agent may be decided so that any undesired effect is not made on the optical properties and mechanical properties. The amount is preferably from 0.001 to 50 parts by mass, and more preferably from 0.01 to 30 parts by mass with respect to 100 parts by mass of the polymer material. The amount of from 0.1 to 15% by mass is especially preferable.

Examples of the plasticizer include phosphate ester-type stabilizers such as cycloalkyl phosphates and aryl phosphates. The substitutions therein may be same or different from each other, and the substitution may have at least one substituent. The stabilizers of the mixtures of phosphates having alkyl, cycloalkyl and aryl may be used. The substituents may connect each other to form a ring. Examples of the phosphate ester-type stabilizer include alkylene bis(dialkyl phosphate) such as ethylene bis(dimethyl phosphate) and butylene bis(diethyl phosphate); alkylene bis(diaryl phosphate) such as ethylene bis(diphenyl phosphate) and propylene bis(dinaphthyl phosphate); arylene bis(dialkyl phosphate) such as phenylene bis(dibutyl phosphate) and bisphenylene bis(dioctyl phosphate); and arylene bis(diaryl phosphate) such as phenylene bis(diphenyl phosphate) and naphthylene bis(ditoluoyl phosphate). The substitutions therein may be same or different from each other, and the substitution may have at least one substituent. The stabilizers of the mixtures of phosphates having alkyl, cycloalkyl and aryl may be used. The substituents may connect each other to form a ring.

Furthermore, any polymers having the phosphate ester moiety therein partially or regularly may be used, and the moiety may be introduced in the molecular of the other additive(s) such as an antioxidant, acid-trapping agent and UV absorbing agent. Among the compounds describe above, aryl phosphates and arylene bis(diaryl phosphate) are preferable. More specifically, triphenyl phosphate and phenylene bis (diphenyl phosphate) are preferable. and the phosphate ester-type plasticizers described in JP-A-6-501040 are also preferable. And the phosphate ester-type plasticizers, hardly volatilizing, described in JP-A-2002-363423, [0027]-[0034], JP-A-2002-265800, [0027]-[0034] and JP-A-2003-155292, [0014]-[0040], are also exemplified.

Examples of the commercially available phosphate ester-type plasticizer include, but are not limited to, Adekastab FP-500, FP-600, FP-700 FP-2100 and PFR (by Asahi Denka Kogyo); and Reoforce BAPP (by Ajinomoto).

As the polyfunctional ester plasticizer, polyester plasticizer and polymer plasticizer, those described in JP-A-2007-231157, [0086]-[0138], can be used, and they may be used alone respectively or in combination with the other(s).

According to the invention, saccharide plasticizers are also preferable. The saccharide plasticizer may be selected from monosaccharides or polysaccharides containing 2-10 of monosaccharide units; and the feature thereof resides in that the substitutable group(s) therein such as hydroxy, carboxyl, amino or mercapto is replaces with substituent group(s). Examples of the substituent group include an ether group, ester group, amido group and imido group. Examples of the monosaccharide and the polysaccharide, containing 2-10 of monosaccharide units, include erythritol, trehalose, ribose, arabinose, xylose, lyxose, arose, altrose, glucose, fructose, mannose, gulose, idose, galactose, talose, trehalose, isotrehalose, neotrehalose, trehalosamine, Kojic biose, nigerose, maltose, maltitol, isomaltose, sophorose, laminaribiose, cellobiose, α-cyclodextrine, β-cyclodextrine, γ-cyclodextrine, δ-cyclodextrine, xylitol and sorbitol.

According to the invention, polymer plasticizers are preferable. Examples of the polymer plasticizer include alicyclic hydrocarbon-base polymers, acryl-base polymers such as poly methyl acrylates and poly methyl methacrylates; vinyl-base polymers such as poly vinyl isobutyl ether and poly N-vinyl pyrolidone; styrene-base polymers such as polystyrene and poly 4-hydroxy styrene; polyesters such as poly butylene succinate, poly ethylene terephthalate and poly ethylene naphthalate; poly ethers such as polyethylene oxide and polypropylene oxide; polyamides; polyurethanes; and polyureas. The number-averaged molecular weight of the polymer is preferably from about 1,000 to about 500,000, and more preferably from about 5,000 to about 200,000. When the molecular weight is equal to or less than 1,000, the volatilization may occur; on the other hand, when the molecular weight is more than 500,000, the polymer may make undesired influence on the mechanical properties of the films. Any homopolymer formed of one type repeating unit or copolymers having plural repeating units formed can be used. Two or more types of the polymers described above may be used; and the polymers may be used along with any other plasticizer, antioxidant, acid-trapping agent, UV absorbing agent, slipping agent or mat agent.

The amount of the compound in the film is preferably from 0.5 to 50% by mass, more preferably from 1 to 30% by mass and much more preferably from 1 to 15% by mass with respect to the mass of the polymer material such as acryl-base polymer. The amount of the compound may be decided depending on the purpose of addition of the compound.

Mat Agent:

The optical compensation film (for example, acryl-base polymer film) of the invention may contain mat agent (occasionally referred to as "fine particles" hereinunder). The fine particles include fine particles of inorganic compounds, and fine particles of organic compounds, and any these are usable herein. The mean primary particle size of the fine particles to be in the thermoplastic polymer for use in the invention is preferably from 5 nm to 3 μm from the viewpoint of reducing the haze of the film, more preferably from 5 nm to 2.5 μm, even more preferably from 10 nm to 2.0 μm. The mean primary particle size of fine particles as referred to herein is determined as follows: A thermoplastic polymer composition is observed with a transmission electronic microscope (having a magnification of from 500,000 to 1,000,000 powers), and the primary particle size of 100 particles is measured, and the data are averaged to be the mean primary particle size of the fine particles. The amount of fine particles to be added is preferably from 0.005 to 1.0% by mass relative to the thermoplastic polymer, more preferably from 0.01 to 0.8% by mass, even more preferably from 0.02 to 0.4% by mass.

The mean secondary particle size of the fine particles in the obtained polymer film is preferably from 0.01 to 5, more preferably from 0.02 to 3 μm, even more preferably from 0.02 to 1 μm. The mean secondary particle size of fine particles as referred to herein is determined as follows: A polymer film is observed with a transmission electronic microscope (having a magnification of from 100,000 to 1,000,000 powers), and the secondary particle size of 100 particles is measured, and the data are averaged to be the mean secondary particle size of the fine particles.

Examples of the inorganic compound include $SiO_2$, ZnO, $TiO_2$, $SnO_2$, $Al_2O_3$, $ZrO_2$, $In_2O_3$, MgO, BaO, $MoO_2$, $V_2O_5$, talc, clay, sintered kaolin, sintered calcium silicate, hydrated calcium silicate, aluminum silicate, magnesium silicate and calcium phosphate. Preferred are $SiO_2$, ZnO, $TiO_2$, $SnO_2$, $Al_2O_3$, $ZrO_2$, $In_2O_3$, MgO, BaO, $MoO_2$ and $V_2O_5$; and more preferred are $SiO_2$, $TiO_2$, $SnO_2$, $Al_2O_3$ and $ZrO_2$.

As fine particles of silicon dioxide, $SiO_2$, for example, commercial products of Aerosil R972, R972V, R974, R812, 200, 200V, 300, R202, OX50, TT600 (all by Nippon Aerosil) are usable. As fine particles of zirconium oxide, $ZrO_2$, for example, commercial products of Aerosil 8976 and R811 (both by Nippon Aerosil) are usable. And SEAHOSTAR KE-E10, E30, E40, E50, E70, E150, W10, W30, W50, P10, P30, P50, P100, P150 and P250 (by NIPPON SHOKUBAI) are also usable. And Silica micro beads P-400 and 700 (by SHOKUBAI KASEI KOGYO) are also usable. And SO-G1, SO-G2, SO-G3, SO-G4, SO-G5, SO-G6, SO-E1, SO-E2, SO-E3, SO-E4, SO-E5, SO-E6, SO-C1, SO-C2, SO-C3, SO-C4, SO-C5 and SO-C6 (by Admatechs) are also usable. And Silica particles 8050, 8070, 8100 and 8150 which are obtained by powderization of water-dispersion (by MORI-TEX Corporation) are also usable.

Organic fine particles such as crosslinked acryl and crosslinked styrene; and elasticity organic fine particles described in JP-A-2008-9378 and 2008-74918; are also usable.

Among the inorganic and organic fine particles, in terms of heat stability in the film-forming step, inorganic fine particles are preferable, and $SiO_2$ fine particles are more preferable.

A master pellet containing polymer material and fine particles in the amount more than the desired ratio may be prepared previously. Using it, pellets in which fine particles are dispersed well can be prepared, and it is possible to prepare an acryl-base polymer film having a good plane condition and good slipping properties. It may be necessary to prepare another master pellet not containing fine particles. The master pellet containing fine particles preferably also contains a stabilizer. The amount of fine particles in the master pellet is not limited, and preferably, the amount of fine particles in the master pellet is from 2 to 50 times, more preferably from 2 to 30 times, much more preferably from 3 to 25 times, and even more preferably from 4 to 20 times of the amount of fine particles in the film. Mixing the master pellets may be carried out by using mixer. Any additive(s) such as a stabilizer, plasticizer or other additive may be added to the master pellet containing fine particles. In such a case, the amount of the additive(s) in the master pellet is preferably from 2 to 50 times, more preferably from 2 to 30 times, much more preferably from 3 to 25 times, and even more preferably from 4 to 20 times of the amount of fine particles in the film.

Other Additives:

As other additive(s), an IR absorbing agent or retardation controlling agent may be added to the film; and the types of these additives are not limited. The amount of the other additive(s) is preferably from 0 to 1000 ppm, more preferably from 0.1 to 5% by mass, and much more preferably from 0.2 to 3% by mass.

1.-2 Production Method for Optical Compensation Film:

The optical compensation film of the invention may be produced according to a solution casting method or a melt casting method, but is produced preferably according to a melt casting method. Especially preferably, the acryl-base polymer film of one embodiment of the invention is produced according to a melt casting method. It is generally known that an acryl-base polymer is easy to thermally decompose, and a lactone ring unit-containing acryl-base polymer, a maleic anhydride unit-containing acryl-base polymer and a glutaric anhydride unit-containing acryl-base polymer are easier to thermally decompose than ordinary acryl-base polymers. On the other hand, the physical properties of a lactone ring unit-containing acryl-base polymer, a maleic anhydride unit-containing acryl-base polymer and a glutaric anhydride unit-containing acryl-base polymer are that they have a higher Tg and have a higher light transmittance than ordinary acryl-base polymers, and therefore, they are favorable as materials for liquid-crystal display devices.

In addition, the properties of the acryl-base polymer film formed of the acryl-base polymer are that the film has a small elongation at break and that, when the film surface is rubbed, the acrylic molecules are readily cut and the rubbed part of the film tends to be a striking scratch; and therefore, when the acryl-base polymer film is formed according to a conventional method, it may readily have rubbed scratched.

When the acryl-base polymer that is easy to thermally decompose is used, especially when the lactone ring unit-containing acryl-base polymer, the maleic anhydride unit-containing acryl-base polymer and the glutaric anhydride unit-containing acryl-base polymer that are easier to thermally decompose are used, the acryl-base polymer film is preferably produced according to the production method to be mentioned below. According to the production method to be mentioned below, the acryl-base polymer film satisfying the above-mentioned optical characteristics can be produced stably. In addition, according to the production method to be mentioned below, the generation of impurities derived from thermal decomposition can be significantly inhibited and acryl-base polymer films free from film surface defects can be produced. Specifically, when a polymer that is easy to thermally decompose is used as the material in film formation, the melting temperature of the polymer could not be high, and therefore the viscosity of the polymer melt must be kept high during film formation. When such a high-viscosity melt is used in film formation, then it may be stretched by a large force at the die outlet port, and a great shear may be given to the film between a touch roll and a chill roll. As a result, even when a high-viscosity acryl-base polymer melt is used in the acryl-base polymer film production method to be mentioned below, an acryl-base polymer film satisfying the necessary optical characteristics can be produced stably. In addition, according to the production method to be mentioned below, a shear may be given to the film surface and the acrylic molecules of the film are thereby stretched to increase the entanglement between the molecules and to increase the elongation at break of the film; and, as a result, the obtained acryl-base polymer film may have few scratches.

Needless-to-say, any other thermoplastic polymer film comprising, as the main ingredient thereof, any other thermoplastic polymer than acryl-base polymer (e.g., cycloolefin-base polymer film) can also be produced for the optical compensation film of the invention, according to the production method to be mentioned below.

Concretely, the film of the invention is produced preferably according to a method comprising a step of preparing a molten polymer (melt), a step of extruding the melt through a die, and a step of solidifying the melt extruded through the die, on a casting roll and forming it into a film. In the step of solidifying the melt extruded through the die, on a casting roll and forming it into a film, preferably, a touch roll is used to press the melt against the casting roll, whereupon a peripheral speed difference in the revolution therebetween is given to the touch roll and the casting roll and a temperature difference of from 0.1° C. to 15° C. therebetween is also given to the two. In this step, an acryl-base polymer film of which the tilt angle of the main axis satisfies $\beta \neq 0$ and $|\beta| \leq 45$ can be produced stably.

The production method is described in detail hereinunder.

1.-2-1 Melting Step:

First, a polymer melt is melt in a melting step. Concretely, a polymer material and an additive are mixed and pelletized, then put into a kneading extruder, melt therein to give a molten polymer (hereinafter this may be referred to as a melt). The pellets are produced as follows: The polymer and the additive are dried and mixed to give a mixture having a water content of at most 0.1%, then the mixture is introduced into the extruder, melted therein at 150° C. to 300° C., and the mixture melt is extruded out as noodles, which are then cut and solidified in air or in water to give pellets. After melted in the extruder, the mixture melt may be directly cut while extruded into water through a nozzle thereby giving pellets, according to an underwater cutting method.

The extruder includes a single-screw extruder, a non-engaging counter-rotating double-screw extruder, an engaging counter-rotating double-screw extruder, an engaging uni-rotating double-screw extruder, etc. Preferably, the number of revolutions of the extruder is from 10 rpm to 1000 rpm, more preferably from 20 rpm to 700 rpm. The extruder retention time is preferably from 10 seconds to 10 minutes, more preferably from 20 seconds to 5 minutes.

Not specifically defined, the size of the pellets may be generally from 10 mm³ to 1000 mm³ or so, preferably from 30 mm³ to 500 mm³ or so.

Preferably, prior to feeding the melt of thermoplastic polymer composition, the water content of the pellets is reduced. Preferably, the drying temperature is from 40 to 200° C., more preferably from 60 to 150° C. Accordingly, the water content is preferably reduced to at most 1.0% by mass, more preferably at most 0.1% by mass. The drying may be attained in air, or in nitrogen, or in vacuum.

Next, the dried pellets are fed into the cylinder via the feeding port of the extruder, and kneaded and melted therein. Preferably, the inside of the cylinder comprises, for example, a feeing zone, a pressing zone, and a metering zone in that order from the side of the feeing port. The screw compression ratio of the extruder is preferably from 1.5 to 4.5; the ratio of the cylinder length to the cylinder inner diameter (L/D) is preferably from 20 to 70; and the cylinder inner diameter is preferably from 30 mm to 150 mm. Further, for preventing the polymer melt from being oxidized with the remaining oxygen in the extruder, preferably, the extruder is purged with an inert gas (e.g., nitrogen), or is degassed in vacuum via a vent.

Preferably, a filter unit with a breaker plate-type filter or a leaf-type disc filter is fitted to the system for removing impurities from the thermoplastic polymer composition by filtration therethrough. The filtration may be one-stage or multi-stage filtration. Preferably, the filtration accuracy is from 2 μm to 15 μm, more preferably from 3 μm to 10 μm. Stainless steel is preferred for the filter material. The filter constitution includes knitted wire nets, and sintered metal fiber or metal powder articles (sintered filters); and preferred are sintered filters.

The filtration is preferably carried out after the end of the mixing step in the extrusion before the extrusion step of extruding the melt from die. It is not preferable that the melt extruded from die is subjected to a filtration since such a treatment likely causes contamination.

For increasing the thickness accuracy by reducing the melt discharge fluctuation, preferably, a gear pump is disposed between the extruder and the thermoplastic polymer composition feeding means (e.g., die). Accordingly, the polymer pressure fluctuation inside the thermoplastic polymer composition feeding means (e.g., die) may be reduced to ±1%. For enhancing the constant feeding capability of the gear pump, there may be employed a method of changing the number of screw revolutions to thereby constantly control the pressure before the gear pump.

The difference in pressure between the entrance and exit of a gear pump is preferably from 1 MPa to 15 MPa, more preferably from 1.5 MPa to 13 MPa, and much more preferably from 2 MPa to 12 MPa. In the description, the term "the difference in pressure between the entrance and exit of a gear pump" means the absolute value of the difference between the measured pressures by the pressure indicators disposed in front of and in the back of a gear pump.

Adjusting the difference in pressure between the entrance and exit of a gear pump to the range from 1.5 MPa to 13 MPa may make it easy to carry out wide film-forming, which gives films having a desired width. Previously, according to the wide film-forming process, the amount of extrusion increased, and therefore, the number of rotations of the screw also increased, which resulted in the unevenness in the thickness of the obtained film due to the unevenness of the number of rotations. Disposing a gear pump may contribute to reducing such unevenness in the thickness. On the other hand, an acryl-base polymer film is easily decomposed by heat, and the yellowish discoloration may occur in the film due to the heat decomposition. Such a yellowish discoloration may increase the wavelength dispersion characteristics, and, sometimes, they may become to fall without the desired range. This may cause the significant color shift in the black state. Furthermore, the contamination may be promoted due to the heat decomposition, which is undesirable. By adjusting the difference in pressure between the entrance and exit of a gear pump to the above described range, it is possible to prevent retention from occurring and to solve these problems.

The pressure at the entrance of the gear pump may be higher or lower than that at the exit. The difference in pressure may be achieved by controlling the extruded amount from the extruder and the number of rotations of the gear pump. The difference in pressure may be achieved also by varying pressure loss due to the difference between the diameters of the pipes of the entrance and exit of the gear pump. When such a difference in pressure is present, the retention of the melt is prevented.

It is to be noted that, usually, the film-forming is carried out with almost no difference in pressure between in front of and in the back of a gear pump.

For preventing the retention of the melt from occurring, a static mixer is preferably disposed on the pipe between the extruder and the die.

The static mixer may be disposed any place on the pipe between the extruder and the die, and is preferably disposed between the filtration mechanism and the die and more preferably disposed in front of and adjacent to the entrance of the die.

The number of the elements of the static mixer is preferably from 4 to 50, more preferably from 5 to 40 and much more preferably from 6 to 30. Because of slow flow-speed and the long retention time of the melt, there may more often cause any contaminant due to the heat decomposition in any portion being close to the wall of the pipe, compared with in the center portion of the pipe. By using a static mixer, the agitation of the melt in the pipe may be promoted and therefore the retention of the melt may be prevented.

The static mixer is preferably created by disposing the above mentioned numbers of rectangular plates twisted with an twisting angle of from 30° to 360° (preferably from 60° to 240°, more preferably from 80° to 200°) along the pipes. By allowing the melt to go through the static mixer having such a structure, the melt may be rotated and the agitation of the melt in the pipe may be promoted. The length of a static mixer is not limited, and the length is preferably from 0.5 to 10 times, more preferably from 0.8 to 6 times and much more preferably from 1.0 to 3 times of the diameter of the pipe.

The material of the static mixer is not limited, and is preferably stainless steel. Preferably, the coat of hard chrome or tungsten carbide is applied.

1.-2-2 Step of Extruding the Polymermelt Through Die:

In the extruder having the constitution as above, the polymer composition is melted, and if desired, the polymer melt is led to pass through a filter and a gear pump, and thereafter it is continuously transferred to a die. The die may be in any type of a T-die, a fishtail die, or a hanger coat die.

Preferably, the die clearance is controllable in a range of from 5 to 50 mm. An automatic thickness control die is also effective, by which the thickness and the thickness deviation of the downstream film are computed and the data are fed back for die clearance control.

Apart from the single-layer film forming apparatus, a multilayer film forming apparatus is also usable herein.

The residence time taken by the polymer composition to run into the extruder via the feeding port and then go out of it via the die is preferably from 3 minutes to 40 minutes, more preferably from 4 minutes to 30 minutes.

1.-2-3 Step of Solidifying the Melt Extruded Through Die on Casting Roll for Film Formation Thereon:

Next the polymer melt sheetwise extruded through the die is cooled and solidified on a casting roll (this may be referred to as a chill roll) to give a film thereon.

In this stage, preferably, the zone between the die and the casting roll is shielded and protected from wind.

When the melt is brought into contact with the casting roll, preferably, the contact between the casting roll and the melt is ensured according to an electrostatic method, an air knife method, an air chamber method, a vacuum nozzle method, a touch roll method or the like. Above all, preferred is a touch roll method as in the above. The contact enhancing method may be applied to the entire surface of the film melt or may be to a part thereof.

Method Employing Only Casting Roll:

The melt, extruded from the die, is cooled on the casting roll at a temperature of from 80 to 200 degrees Celsius, more preferably from 90 to 190 degrees Celsius and much more preferably from 100 to 180 degrees Celsius to be solidified. According to this treatment, the shrinkage in the side having a lower temperature occurs more than that occurring in another side having a higher temperature. Therefore, the difference in stress (shear stress) between the both sides of the film occurs due to the difference in the degree of shrinkage between the both sides of the film. According to the step, the optical properties satisfying the condition of that the tilt angle $\beta$ of the main axis is not equal to zero, $\beta \neq 0$, (preferably, $|\beta| \leq 45$). And such a stress may prompt the alignment of molecules in plane and along the thickness direction, and therefore, Re and Rth may be developed slightly.

For achieving the difference in the temperature between both sides of the film, the alleger extrusion amount of the melt is more preferable. For preparing the acryl-base polymer film, which is an example of the invention, the extrusion amount of the melt is preferably from 100 kg/hour to 500 kg/hour, more preferably from 120 kg/hour to 400 kg/hour, and much more preferably from 140 kg/hour to 300 kg/hour. By adjusting the extrusion amount to the above mentioned range, the melt, extruded from the die, can reach the casting roll before the temperature of the melt is lowered. After that, the side of the film disposed on the casting roll is cooled drastically; and, on the other hand, another side of the film is cooled moderately, which results in the difference in the temperature between the both sides of the film.

In such an extrusion with a high rotative speed, the shear stress between the screw and the barrel may increase, and as a result, the decomposition of the polymer material due to molecular breaks may be promoted. As a result, the polymer changes yellowish; the spectral absorption may be varied; and therefore, the wavelength dispersion characteristics of Re and Rth may be adjusted to the preferable range. Regarding the melt before being subjected to this treatment, the wavelength dispersion characteristics of Re and Rth may be zero.

It may be necessary to increase the number of rotations of the screw, and as a result, heat due to shearing force may be developed. Acryl-base polymers are easily decomposed by heat; and as a result, yellowish discoloring is too much, which is undesirable. The contamination due to the thermal decomposition is increase, which is also undesirable. For solving such a problem, in the film-forming step, preferably, the temperature of the screw at the entrance is higher by a temperature of from 3 to 50 degrees Celsius, more preferably from 5 to 45 degrees Celsius, and much more preferably from 8 to 40 degrees Celsius, that the temperature thereof at the exit. In the portion close to the entrance of the screw, the pellets are rubbed each other strongly since they are not melt yet, which causes the friction heat easily. Therefore, it is preferable to lower the temperature of this portion. On the other hand, in the portion close to the exit of the screw, the pellets are melt fully, which causes the friction heat hardly. Therefore, it is preferable to increase the temperature of this portion, or that it, the temperature of the melt, for achieving the difference in the temperature between the both sides of the film.

Furthermore, by increasing the temperature of the exit of the screw, the decomposition of the polymer material may be promoted, and as a result, the polymer film may change yellowish slightly. Therefore, the wavelength dispersion characteristic of Re and Rth may be adjusted to the desired range.

It is to be noted that, according to the previous process. the step is carried out with a constant temperature of the screw, as described in JP-A-2007-297615, Examples 1.

The temperature of the exit of the screw is preferably from 210 to 280 degrees Celsius and more preferably from 220 to 270 degrees Celsius.

Method Employing Touch Roll:

In the description, the term "chilled roll" means a casting roll which contacting the melt, extruded from die, firstly; and the term "touch roll" means a roll disposed facing with the chilled roll. According to the method, the melt, extruded from the die, is cooled between the touch roll and the chilled roll to be solidified. It is to be noted that the term "casting roll" hereinunder indicates both of the chilled roll and any casting rolls following the chilled roll The method comprises the step of extruding the melt from the die and the step of allowing the melt to pass between the chilled roll and the touch roll to form a film, wherein the peripheral speeds of the rolls are different from each other. According to the invention, the peripheral speed ratio of the chilled roll and the touch roll is defined as the following formulae. In one preferable example of the method, the peripheral speed ratio is adjusted to the range of from 0.60 to 0.99, and as a result. shear stress is applied to the melt. The peripheral speed ratio is preferably from 0.60 to 0.99, and more preferably from 0.75 to 0.98.

$$\text{Peripheral speed ratio=peripheral speed of the chilled roll/peripheral speed of the touch roll} \quad (I)$$

When the melt is cooled between the casting roll and touch roll, the temperatures of the rolls are preferably set to fall between (Tg−30° C.) and (Tg+10° C.) where Tg indicates the glass transition temperature of the polymer, more preferably between (Tg−20° C.) and (Tg+7° C.), more preferably between (Tg−10° C.) and (Tg+3° C.). For example, in the embodiments using the acryl-base polymer as a material, the temperatures are preferably from 60 to 160 degrees Celsius, more preferably from 70 to 150 degrees Celsius and much more preferably from 80 to 140 degrees Celsius. However, the temperatures are not limited to the ranges.

The difference in the temperature between the touch roll and the casting roll is preferably from 0.1 to 15 degrees Celsius, more preferably from 0.3 to 12 degrees Celsius, and much more preferably from 0.5 to 10 degrees Celsius. By adjusting the difference in the temperature between the rolls to the above mentioned range, it is possible to adjust β to the desired range easily, which is preferable.

The temperature of the touch roll may be higher or lower than that of the casting roll; and preferably, the temperature of the touch roll is lower than that of the casting roll. After passing through between the touch roll and the casing roll, the melt is transported on the casting roll. When the temperature of the casting roll is higher, the melt can be transported more stably on the casting roll having higher temperature due to adjustability.

Controlling the temperature of the roll(s) can be performed by flowing any liquid or gas whose temperature is controlled inside of the roll(s). The means for controlling the temperature is preferably disposed inside. Examples of the means for controlling the temperature are as follows. In the one embodiment, the touch roll is disposed on a metal shaft, and the heat carrier (fluid) is allowed to pass between them. Or in another embodiment, the elastic body is disposed between the external cylinder and the metal shaft, and the external cylinder is filled with the heat carrier (fluid). In these embodiments, by controlling the temperature of the heat carrier, it is possible to control the temperature of the touch roll.

According to the process of preparing the film, the landing point of the melt preferably falls within the range of 10 mm±the center of the clearance between the touch roll and the casting roll, more preferably 5 mm±the center, and much more preferably 3 mm±the center.

The term of "the landing point of the melt" indicates the point where the melt touches the touch roll or the chilled roll first. And the term "the center of the clearance between the touch roll and the casting roll" indicates the center of the clearance, which is narrowest, between the surfaces of the touch roll and the casting roll.

Usually, the landing point of the melt is the center of the clearance. However, according to the invention, the landing point may depart from the center slightly. The landing point of the melt may be on the touch roll or the chilled roll.

The term "the touch pressure" indicates the value which is obtained by dividing the force for pressing touch roll by the contacting area of the film and the touch roll.

The touch pressure is preferably from 0.1 MPa to 10 MPa, more preferably from 0.3 MPa to 7 MPa, and much more preferably from 0.5 MPa to 3 MPa.

By adjusting the difference in the temperature between the touch roll and the casting roll and the touch pressure to the above mentioned ranges, it is possible to prepare the films having β, Re and Rth suitable for IPS- or FFS-mode liquid crystal displaying devices.

For achieving such a weak touch pressure, the touch roll having elasticity is more preferable than that having high rigidity. A touch roll having an external cylinder with a thinner thickness than usual is preferable. The thickness Z of the external cylinder is preferably from 0.05 mm to 7.0 mm, more preferably from 0.2 mm to 5.0 mm and much more preferably from 0.3 mm to 3.5 mm.

Preferably, the surface of the touch or casting roll has an arithmetic mean height Ra of at most 100 nm, more preferably at most 50 nm, even more preferably at most 25 nm. By using the rolls having an arithmetic mean height Ra falling within the abovementioned range, it is possible to prepare the films having appropriate concavities and convexities.

The touch roll and the casting roll is preferably made of a metal and more preferably made of stainless. The touch roll and casting roll having the metal coat thereon are also preferable. By using the touch roll and the casting roll having the surface made of a metal, it is possible to adjust Ra of the tolls to the range of not greater than 100 nm easily. On the other hand, any rubber roll or any metal roll being subjected to a lining application with rubber may have large concavities and convexities, and as a result, it is not possible to easily prepare the films having appropriate concavities and convexities.

The touch rolls described in JP-A-11-314263, 2002-36332 and 11-235747 and WO97/28950, JP-A-2004-216717 and 2003-145609 may be used in the invention.

Using plural casting rolls and cooling the melt by them are preferable. In this embodiment, the touch roll may be disposed so as to touch a first casting roll, which is closest to the die among them, that is, the chilled roll. Usually, 2-6 rolls are used; however the number of the rolls is not limited. The diameter of the roll is preferably from 100 mm to 1500 mm, and more preferably from 150 mm to 1000 mm. The clearance between the rolls is preferably from 0.3 mm to 300 mm, more preferably from 1 mm to 100 mm, and much more preferably from 3 mm to 30 mm.

In one embodiment, the melt extruded from the die is solidified on the three or more casting rolls. According to the embodiment, the temperature of the lower casting roll is lower by a temperature of from 1 to 15 degrees Celsius, more preferably from 1 to 10 degrees Celsius and much more preferably from 2 to 8 degrees Celsius, than the temperature of the upper casting roll.

By controlling the temperatures of the multiple casting rolls, it is possible to prompt the improvement of the packing density via the cooling step. As a result, it is possible to easily adjust Ra of the film to the desired range. Furthermore, it is possible to make the physical property of the both sides of a film regularity. Furthermore, it is possible to cancel the distortion in a film. By using such a film in liquid crystal display devices, it may be possible to reduce the distortion of the images.

In the method employing the touch roll, the extrusion amount of the melt is preferably from 100 kg/hour to 500 kg/hour. The more preferable ranges are same as those in the method not employing the touch roll. By adjusting the extrusion amount to the above mentioned range, the extrusion speed (line speed) of the melt onto the roll may be elevated, and therefore, the effect of the shrinkage stress may be more developed between the both sides of the film. Or in other words, it is possible to apply the deformation to the film for a shorter time, and to prevent β, Re and Rth of the film from relaxing or reducing.

For achieving the extrusion amount, it is helpful to set the temperature of the exit of the screw higher than that of the entrance. The wavelength dispersion characteristic of Re and Rth can be adjusted to the desired range by the effect of theses factors such as the extrusion amount and the temperature of the screw.

1.-2-4 Film Width:

In this description, the film width means the melt width between the die and the casting roll in the step of extruding the melt through a die; and the melt width is substantially equal to the width of the solidified film before the trimming step to be mentioned below. The mean value of the film width is determined as follows: The width of a film having a length of 10 m, just after formed but before trimmed, is continuously measured and the data are averaged to give the mean value of the film width. The fluctuation of the film width is as follows: The width of a film having a length of 10 m, just after formed but before trimmed, is continuously measured, and the difference between the maximum value and the minimum value is divided the by the mean film width and is expressed as a percentage.

In the film production method in the invention, the film width fluctuation is preferably from 1% to 15%, more preferably from 2% to 14%, even more preferably from 3% to 12%.

The film width fluctuation can be controlled in film formation to give a film having a mean width of from 1 m to 3 m, more preferably from 1.4 m to 2.6 m, even more preferably from 1.6 m to 2.4 m.

1.-2-5 Trimming:

Preferably, the formed film is trimmed on both sides thereof. The part trimmed away from the film may be recycled as a film-forming material.

1.-2-6 Knurling:

Also preferably, the film is knurled on one side or both sides thereof. The height of the knurl to be formed by the knurling treatment is preferably from 1 μm to more preferably from 3 μm to 20 μm. In the knurling treatment, a protrusion may be formed on one surface or both surfaces. The width of the knurl is preferably from 1 mm to 50 mm, more preferably from 3 mm to 30 mm. The knurling treatment may be carried out at room temperature to 300° C.

1.-2-7 Winding:

After this, the film is peeled away from the casting roll and, after having passed through nip rolls, this is wound up. The winding speed is preferably from 10 m/min to 100 m/min, more preferably from 15 m/min to 80 m/min, even more preferably from 20 m/min to 70 m/min.

Preferably, the winding tension is from 2 kg/m-width to 50 kg/m-width, more preferably from 5 kg/m-width to 30 kg/m-width.

Also preferably, a laminate film may be stuck to one or both surfaces of the film. The thickness of the laminate film is preferably from 5 μm to 100 μm, more preferably from 10 μm to 50 μm. Not specifically defined, the material may be any of polyethylene, polyester, polypropylene, etc.

1.-2-8 Stretching:

The thermoplastic film formed by melt casting is preferably stretched in the machine direction and/or in the transverse direction, optionally as combined with relaxation shrinkage treatment. The film traveling speed (speed before stretching) in the machine-direction stretching and the transverse-direction stretching treatment is preferably from 10 m/min to 50 m/min, more preferably from 12 m/min to 40 m/min, even more preferably from 15 m/min to 35 m/min.

Machine-Direction Stretching:

The machine-direction stretching may be attained as follows: Two pairs of nip rolls are disposed, and the film to be stretched is led to pass through them under heat, whereupon the peripheral speed of the nip rolls on the outlet port side is made higher than the peripheral speed of the nip rolls on the inlet port side. In this stage, the length (L) between the nip rolls and the width (W) of the unstretched film may be varied, thereby varying the expressibility of the thickness-direction retardation of the stretched film. When L/W is from 2 or more to 50 (in long spun stretching), Rth of the stretched film may be small; and when L/W is from 0.01 to 0.3 (in short spun stretching), Rth thereof may be large. In producing the optical compensation film of the invention, employable is any method of long spun stretching, short spun stretching or middle spun stretching between the two (in middle spun stretching, LAN is from more than 0.3 to 2). Preferred is long spun stretching or short spun stretching in which the alignment angle could be small. For making the stretched film have a further higher Rth, preferred is short spun stretching; and for making the stretched film have a lower Rth, preferred is long spun stretching. In that manner, more preferably, the stretching mode is suitably selected depending on the intended retardation of the stretched film.

The stretching temperature in the machine-direction stretching is preferably from (Tg−10) to (Tg+50) degrees Celsius, more preferably from (Tg−5) to (Tg+40) degrees Celsius, and much more preferably from (Tg) to (Tg+30) degrees Celsius. The stretching ratio is preferably from 2% to 200%, more preferably from 4% to 150%, and much more preferably from 6% to 100%. In the description, the stretching ratio is defined as follows.

Stretching ratio(%)=100×{(length of a stretched film)−(length of an unstretched film)}/(length of an unstretched film)

Transverse-Direction Stretching:

The unstretched film may be stretched in the transverse direction, using a tenter. Specifically, both sides of the film in the y-axis direction are held with clips, and the film is expanded in the transverse direction. In this stage, the stretching temperature may be controlled by introducing air at a predetermined temperature into the tenter. The stretching temperature in the transverse-direction stretching is preferably from Tg−10 to Tg+60 degrees Celsius, more preferably from Tg−5 to +45 degrees Celsius, and much more preferably from Tg to Tg+30 degrees Celsius. The stretching ratio is preferably from 10% to 250%, more preferably from 20% to 200%, and much more preferably from 30% to 150%.

1.-2-9 Heat Treatment:

The film may be preheated before the stretching or may be post-heated after the stretching, whereby the fluctuation of the alignment angle owing to bowing of the stretched film may be reduced. One or both of the preheating and post-heating may be attained; but preferably both of the two are attained. Preferably, the preheating treatment and post-heating treatment are attained while the film is held with clips, or that is, the treatment is preferably attained in succession to stretching. In thermal fixation of the film, preferably, the tenter width is kept almost constant. The wording "almost constant" as referred to herein is meant to indicate a range of from 0% of the tenter width after stretching (the same width as the tenter width after stretching) to −10% thereof (the width is reduced to be smaller by 10% than the tenter width after stretching=width reduction). Width expansion to be larger than the stretching width is unfavorable since the processed film may have residual strain remaining therein.

The postheating is preferable at a temperature lower by from 1 to 50° C., more preferably by from 2 to 40° C., and much more preferably by from 3 to 30° C., than the stretching temperature. The temperature in the postheating is preferably equal to or higher than the stretching temperature and equal to or lower than Tg. The postheating time is preferably from one second to ten minutes, more preferably from five seconds to four minutes and from ten seconds to two minutes.

The preheating is preferably at the stretching temperature±50° C., more preferably at the stretching temperature±35° C., even more preferably at the stretching temperature±20° C. In case where the film after the post-heating treatment is bowed convexly in the machine direction, the stretching temperature is preferably lowered more; but when it is bowed concavely in the machine direction, then the stretching temperature is preferably raised higher. The preheating time is preferably from 1 second to 10 minutes, more preferably from 5 seconds to 4 minutes, even more preferably from 10 seconds to 2 minutes. In the preheating, preferably, the tenter width is kept almost constant. The wording "almost constant" as referred to herein means±10% of the width of the unstretched film.

To that effect, preferably, thermal fixation temperature<stretching temperature<preheating temperature.

As a result of the stretching of that mode, the fluctuation of Re and Rth in the y-axis direction and in the x-axis direction, and also the deviation of the alignment angle from MD (x-axis direction) or TD (y-axis direction) can be reduced.

1.-2-10 Relaxation Treatment:

Preferably, the film is processed for relaxation after the MD and/or TD stretching. For the relaxation, preferably, the film is heated at Tg±40° C., more preferably at Tg±30° C., even more preferably at Tg±20° C., under low tension (preferably from 0.1 to 10 kg/m, more preferably from 0.2 to 5 kg/m, even more preferably from 0.3 to 3 kg/m), for preferably from 0.1 minutes to 30 minutes, more preferably from 0.3 minutes to 15 minutes, even more preferably from 0.5 minutes to 8 minutes. Through the treatment for relaxation, the residual strain remaining inside the film can be removed not changing the birefringence (retardation) of the film expressed by stretching.

1.-2-11 Processing of Film:

Preferably, the optical compensation film of the invention may be combined with a functional layer described in detail in Hatsumei Kyokai Bulletin (No. 2001-1745, published on Mar. 15, 2001 by the Hatsumei Kyokai), pp. 32-45. Especially preferably, a polarizing layer is added to the film to produce a polarizing plate; an optically-anisotropic layer is added thereto; or an antireflection layer is added thereto to produce an antireflection film.

Surface Treatment:

The optical compensation film of the invention may be processed for surface treatment for enhancing the adhesiveness thereto to any other members (e.g., polarizing element). The surface treatment includes, for example, corona discharging, glow discharging, UV irradiation, flame treatment, etc.

Processing into Polarizing plate:

A polarizing plate usable in the liquid-crystal display device of the invention can be produced by laminating at least a polarizing element (hereinafter this may be referred to as a polarizing film) on the optical compensation film of the invention. The polarizing plate usable in the liquid-crystal display device of the invention is described below.

The polarizing plate is not specifically defined in point of its constitution, and it may be any one comprising the optical compensation film of the invention and a polarizing element. For example, in the polarizing plate comprising a polarizing element and two polarizer-protective films (transparent polymer films) for protecting both surfaces of the element, the optical compensation film of the invention may be at least one of the polarizer-protective films. For the purpose of enhancing the adhesiveness between a polarizing element of a polyvinyl alcohol film or the like and the optical compensation film of the invention, a layer of a material having good adhesiveness to the material of the polarizing element may be formed on the surface of the optical compensation film of the invention, and the surface of the polarizing element may be stuck to the surface of that layer. For example, a cellulose acylate has a relatively good adhesiveness to a polyvinyl alcohol film. Preferably, therefore, a coating liquid of a cellulose acylate is applied to the surface of the optical compensation film of the invention to thereby form a cellulose acylate layer thereon, and the surface of that layer is stuck to the surface of a polarizing element optionally via an adhesive given therebetween. The polarizing plate may have, on at least one surface thereof, an adhesive layer via which the polarizing plate is stuck to any other member. In the polarizing plate, when the surface of the optical compensation film of the invention has a roughened structure, then the polarizing plate may have an antiglare function. In the polarizing plate, also preferably used is an antireflection film produced by laminating an antireflection layer (low-refractivity layer) on the surface of the optical compensation film of the invention, or a lamination film produced by laminating an optically-anisotropic layer on the surface of the optical compensation film of the invention.

In general, a liquid-crystal display device comprises a liquid-crystal cell disposed between two polarizing plates, therefore having four polarizer-protective films. The optical compensation film of the invention may be any of those four polarizer-protective films, but is especially advantageously used as the protective film to be disposed between the liquid-crystal cell and the polarizing plate in the liquid-crystal display device.

More preferably, the polarizing plate has a constitution of a protective film (e.g., cellulose acylate film), a polarizing element and the optical compensation film of the invention formed of the above-mentioned acryl-base polymer film or the like, as laminated in that order. Also preferably, the polarizing plate may have a constitution of a protective film of a cellulose acylate or the like, a polarizing element, the optical compensation film of the invention formed of the above-mentioned acryl-base polymer film or the like, and an adhesive layer, as laminated in that order.

2. IPS-Mode and FFS-Mode Liquid-Crystal Display Device:

The invention also relates to an IPS-mode or FFS-mode liquid-crystal display device comprising the optical compensation film of the invention. The optical compensation film of the invention may be incorporated in the liquid-crystal display device as an independent member of the device or as a part of the constitutive member thereof, for example, as a protective film for the polarizing plate in the device, or the like.

2.-1 IPS-Mode Liquid-Crystal Display Device:

An IPS mode is a mode of a liquid-crystal display device in which the liquid-crystal material is aligned nearly in parallel to each other at the time of black level of display. In this, therefore, the liquid-crystal molecules are aligned in parallel to the surface of the substrate in no voltage application thereto, at the time of black level of display. The IPS-mode liquid-crystal display device of the invention has the advantage of little light leakage in oblique directions at the time of black level of display.

FIG. 1 is a schematic cross-sectional view of one example of the IPS-mode liquid-crystal display device of the invention. In FIG. 1, the relative relationship in the thickness between the constitutive layers does not reflect the relative relationship in the thickness in an actual liquid-crystal display device. The same shall apply to FIG. 2 and FIG. 3.

The liquid-crystal display device of FIG. 1 comprises an IPS-mode liquid-crystal cell LC, a polarizing plate PL1 on the panel side, and a polarizing plate PL2 on the backlight side. The polarizing plates PL1 and PL2 each comprise a polarizing element 10, an optical compensation film 12 of the invention satisfying the above-mentioned predetermined characteristics, and a protective film 14 of a cellulose acetate film or the like, in which the optical compensation film 12 of the invention is disposed between the polarizing element 10 and the IPS-mode liquid-crystal cell LC. The two polarizing elements 10 are so disposed that their absorption axes 10a are perpendicular to each other; and the two optical compensation films 12 are so disposed that one of their in-plane slow axes 12a is in parallel to the absorption axis 10a of the polarizing element 10 disposed adjacent to the film and that the other thereof is perpendicular thereto. The rubbing axis in rubbing treatment given to the substrate of the liquid-crystal cell LC is perpendicular to the absorption axis 10a of the polarizing element 10 of the polarizing plate PL1 and is in parallel to the absorption axis 10a of the polarizing element 10 of the polarizing plate PL2.

The product of the birefringence Δn of the liquid-crystal molecules in the liquid-crystal layer (liquid-crystal material) of the liquid-crystal cell LC and the liquid-crystal cell gap d, (Δn×d) may be from 250 nm to 400 nm or so. More preferably, the product is from 270 nm to 390 nm, even more preferably from 280 nm to 380 nm. The product (Δn×d) is preferably from 250 nm to 400 nm, as capable of increasing the display contrast. The cell gas d is preferably from more than 2.8 μM to less than 4.5 μm. The liquid-crystal cell gap d can be controlled by the use of polymer beads, glass beads or fibers, resinous pillar spacers, etc. As the liquid-crystal material to form the liquid-crystal layer (liquid-crystal cell), usable is a nematic liquid crystal having a positive dielectric anisotropy Δ∈. Not specifically defined, any and every nematic liquid crystal having the characteristic can be used as the liquid-crystal material. Preferably, the dielectric anisotropy Δ∈ of the liquid-crystal material for use herein is smaller, as capable of reducing the driving voltage for the device; and the refractivity anisotropy Δn thereof is also preferably smaller since the thickness (gap) of the liquid-crystal layer could be larger and the time to be taken for injecting the liquid crystal into the cell can be shorted more and the gap fluctuation can be reduced more.

In the liquid-crystal cell LC, the liquid crystal is aligned horizontally as running along the rubbing axis in no application of driving voltage thereto at the time of black level of display. However, the device has a pretilt angle in some degree, in which, therefore, the liquid crystal is not in a completely horizontal alignment state, and the alignment state of the liquid crystal is asymmetric relative to the axis inclined from the normal line direction. The IPS-mode liquid-crystal display device of FIG. 1 has the optical compensation film 12 disposed therein, and is therefore free from a problem of light leakage in oblique directions at the time of black level of display, and in addition, this is also free from the problem of asymmetricity, and can attain more ideal black display. For example, an embodiment where the tilt angle β of the main axis of the optical compensation film 12 is β≠0 and |β|≤45 is effective for solving the problem of light leakage at the time of black level of display, for an IPS-mode liquid-crystal cell LC having a pretilt angle of from 0.2 to 10° or so. For realizing the effect of the optical compensation film of the invention, preferably, the optical compensation film of the invention is so disposed in the device that pretilt direction of the liquid-crystal layer is the same as the tilt direction of the main axis of the optical compensation film or is opposite thereto (in the mirror-symmetric direction).

Figure 2:
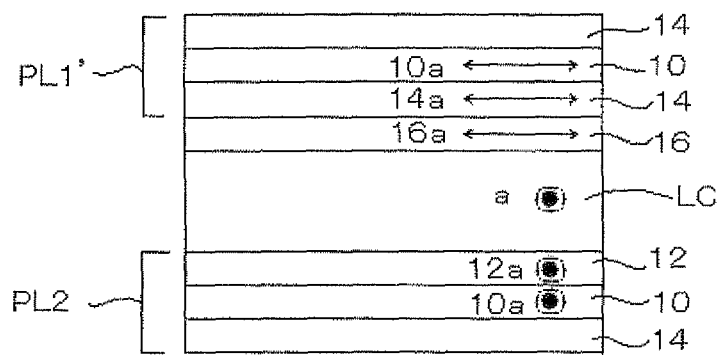
FIG. 2 is a schematic cross-sectional view of another example of an IPS-mode liquid-crystal display device of the invention.

FIG. 2 is a schematic cross-sectional view of another example of the IPS-mode liquid-crystal display device of the invention. The same reference numeral or sign is given to the same member like in FIG. 1, and its description is omitted herein.

The liquid-crystal display device of FIG. 2 has a polymer film 16 between a polarizing plate PL1' on the panel side and the IPS-mode liquid-crystal cell LC. As the polymer film 16, preferred is a cycloolefin-base polymer film comprising a cycloolefin-base polymer as the main ingredient thereof. The cycloolefin-base polymer film may be a commercial product, and for example, JSR's Arton film is usable. The polymer film 16 is so disposed that its in-plane slow axis 16a is in parallel to the absorption axis 10a of the polarizing element 10 of the polarizing plate PL1'. The polarizing plate PL1' on the panel side has a protective film 14 of a cellulose acetate film or the like having Re of around 3.0 nm or so and having Rth of around 45 nm or so on both surfaces of the polarizing element 10.

Having the optical compensation film 12 of the invention that satisfies the above-mentioned predetermined characteristics, the liquid-crystal display device of FIG. 2 solves the problem of the asymmetricity in light leakage occurring in oblique directions at the time of black level of display, like the liquid-crystal display device of FIG. 1.

Figure 3:
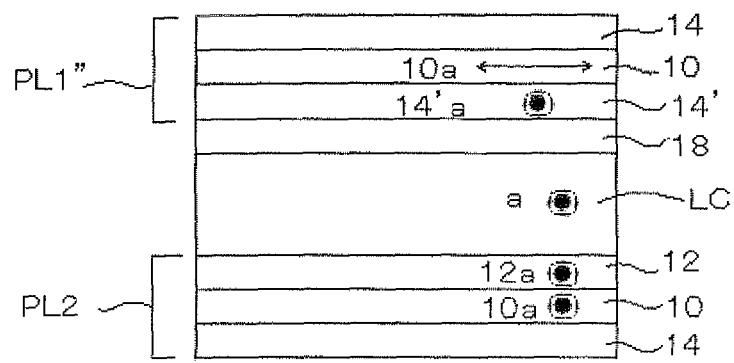
FIG. 3 is a schematic cross-sectional view of still another example of an IPS-mode liquid-crystal display device of the invention.

FIG. 3 is a schematic cross-sectional view of still another example of the IPS-mode liquid-crystal display device of the invention. The same reference numeral or sign is given to the same member like in FIG. 1, and its description is omitted herein.

The liquid-crystal display device of FIG. 3 has a positive C-plate 18 between a polarizing plate PL1" on the panel side and the IPS-mode liquid-crystal cell LC. The positive C-plate may be formed of any material such as a polymer material, a liquid-crystal material, etc. The polarizing plate PL1" on the panel side has an optically-biaxial protective film 14' between the polarizing element 10 and the positive C-plate 18. The protective film 14' satisfying the characteristic may be a commercial product. The protective film 14' is so disposed that its in-plane slow axis 14'a is in parallel to the rubbing axis in rubbing treatment applied to the substrate of the liquid-crystal cell LC. In an embodiment where the positive C-plate 18 is a non-self-supporting layer formed by coating, transcription or the like, the protective film 14' preferably functions also as the support for the positive C-plate. In this description, the positive C-plate is a retardation member having Re of nearly zero and having Rth of from 0 to 300 nm or so.

Having the optical compensation film 12 of the invention that satisfies the above-mentioned predetermined characteristics, the liquid-crystal display device of FIG. 3 solves the problem of the asymmetricity in light leakage occurring in oblique directions at the time of black level of display, like the liquid-crystal display device of FIG. 1; and further, as additionally having the optically-biaxial protective film 14' and the positive C-plate 18, the device is more effective for overcoming the problem of light leakage and can therefore attain further more ideal black display.

For the concept of IPS-mode liquid-crystal display devices, for example, herein referred to are the descriptions in JP-A 2003-15160, 2003-75850, 2003-295171, 2004-12730, 2004-12731, 2005-106967, 2005-134914, 2005-241923, 2005-284304, 2006-189758, 2006-194918, 2006-220680, 2007-140353, 2007-178904, 2007-293290, 2007-328350, 2008-3251, 2008-39806, 2008-40291, 2008-65196, 2008-76849, 2008-96815.

2.-2 FFS-Mode Liquid-Crystal Display Device:

An FFS-mode liquid-crystal cell has a counter electrode and a pixel electrode. These electrodes are formed of a transparent substance such as ITO or the like, and are so designed as to have a width narrower than the distance between the upper and lower substrates and capable of driving all the liquid-crystal molecules disposed above the electrode. Having the constitution, the FFS mode can realize a further higher aperture ratio than in the IPS mode. In addition, since the electrode part is light-transmissive therein, the FFS mode can realize a further more increased light transmittance than the IPS mode. For the concept of FFS-mode liquid-crystal cell display devices, for example, herein referred to are the descriptions in JP-A 2001-100183, 2002-14374, 2002-182230, 2003-131248, 2003-233083.

As having the optical compensation film of the invention disposed therein, or as having the optical compensation film of the invention disposed therein as combined with the additional film having the above-mentioned predetermined optical characteristics, the FFS-mode liquid-crystal display device of the invention can realize ideal black display, like the above-mentioned IPS-mode liquid-crystal display devices of the invention. In the FFS-mode liquid-crystal display device, preferably, the optical compensation film of the invention is disposed between the liquid-crystal cell and the polarizing element on the panel side.

EXAMPLES

The characteristic features of the invention are described more concretely with reference to the following Examples and Comparative Examples. In the following Examples, the materials used, their amount and their ratio, the details of the treatment and the treatment process may be suitably modified or changed not overstepping the sprit and the scope of the invention. Accordingly, the scope of the invention should not be limitatively interpreted by the following Examples.

1. Production of Acryl-Base Polymer Film

1.-1 Preparation of Acryl-Base Polymer:
Lactone Ring Unit-Containing Acryl-Base Polymer LA-1:
  A lactone ring unit-containing acryl-base polymer LA-1 was prepared.
  According to Production Example 1 in [0222] to [0224] in JP-A 2008-9378, an acryl-base polymer LA-1 having a degree of lactonization of 98% and Tg=134° C. was produced from 7500 g of methyl methacrylate and 2500 g of methyl 2-(hydroxymethyl)acrylate.
Maleic Anhydride Unit-Containing Acryl-Base Polymer Ma-1:
  Asahi Kasei Chemicals' Delpet 980N was prepared as a maleic anhydride unit-containing acryl-base polymer MA-1. The acryl-base polymer has Tg of 117° C., and contains 15 mol % of maleic anhydride, 18 mol % of styrene and 67 mol % of methyl methacrylate of all the constitutive monomers.
1.-2 Production Example for Acryl-Base Polymer Film:
  The prepared acryl-base polymer MA-1 was dried in a vacuum drier at 90° C. to make it have a water content of at most 0.03%, and 0.3% by weight of a stabilizer (Irganox 1010 (by Ciba-Geigy)) was added thereto. Using a vented double-screw kneading extruder, this was extruded out into water as strands, in a nitrogen current atmosphere at 230° C., and the cut into pellets having a diameter of 3 mm and a length of 5 mm.
  The pellets were dried in a vacuum drier at 90° C. to make them have a water content of at most 0.03%, and then, using a single-screw kneading extruder, this was kneaded and extruded out at the temperature shown in Table 1. Next, a 300-mesh screen filter was disposed between the extruder and a gear pump. Next, this was led to pass through the gear pump under the condition shown in Table 1, then led to pass through a leaf disc filter having a filtration accuracy of 7 μm, and the melt was extruded out through a die, and cast under the condition shown in Table 1. "Differential pressure before and after gear pump" in Table 1 is a value computed by subtracting the backside pressure from the front side pressure; and in "deviation of melt landing point from touch roll/casting roll intermediate point", the positive data mean that the melt landed on the touch roll side, and the negative data means that the melt landed on the casting roll side.

After the above, the melt (polymer melt) was extruded out onto a series of three casting rolls. In this, a touch roll was kept in contact with the most upstream casting roll (chill roll) under the surface pressure shown in Table 1 below. As the touch roll, herein used was one described in Example 1 in JP-A 11-235747 (as double-press roll; in this, however, the thickness of the thin-wall metal jacket was changed to 2 mm), and this was used under the touch pressure shown in Table 1 at Tg–15° C. The temperature of the series of three casting rolls including the chill roll was so controlled that the casting roll (first roll) kept in contact with the touch roll on the most upstream side could have the temperature difference (casting roll temperature–touch roll temperature) as in Table 1. The next casting roll (second roll) was kept at the temperature of the first roll–5° C.; and the following casting roll (third roll) was kept at the temperature of the first roll–10° C.

Next, just before wound up, the film was trimmed on both sides thereof (by 5 cm of the overall width), and then knurled on both sides thereof to a width of 10 mm and a height of 20 μm. The final film width was 1.5 m and the film was wound up at a film formation speed of 30 m/min to a length of 3000 m. The thickness of the thus-produced, unstretched film was 60 μm. The acryl-base polymer film is an acryl-base polymer film 1 of the invention.

Acryl-base polymer films 2 to 4 of the invention were produced in the same manner as in Example 1, for which, however, the acryl-base polymer, the screw temperature difference, the extrusion rate, the differential pressure before and after the gear pump, the temperature difference between the surface and the back of the melt on the casting roll, the peripheral speed of the casting roll and the touch roll, the temperature difference between the casting roll and the touch roll, the melt landing point and the touch pressure of the touch roll were changed as in Table 1 below.

An acryl-base polymer film C1 of Comparative Example was produced also in the same manner as in Example 1, for which, however, the acryl-base polymer and the condition for film formation were changed as in Table 1 below.

The acryl-base polymer films 1 to 4 and the comparative acryl-base polymer film C1 were analyzed according to the methods mentioned in the above to determine the tilt angle β[°], and also Re, Rth and the wavelength dispersion characteristics thereof. The results are shown in Table 2 below.

TABLE 1

| Acryl-base polymer film | (1) | (2) (° C.) | (3) (Kg/hr) | (4) (MPa) | (5) (° C.) | (6) (m/min) | (7) (m/min) | (8) (° C.) | (9) (mm) | (10) (MPa) |
|---|---|---|---|---|---|---|---|---|---|---|
| 1 | MA-1 | 25 | 300 | 10 | — | 5.1 | 5.0 | 15 | −0.6 | 1.5 |
| 2 | MA-2 | 25 | 300 | 10 | — | 5.2 | 5.0 | 15 | −0.6 | 5 |
| 3 | MA-2 | 25 | 300 | 10 | — | 5.8 | 5.0 | 15 | −0.6 | 15 |

TABLE 1-continued

| Acryl-base polymer film | (1) | (2) (°C.) | (3) (Kg/hr) | (4) (MPa) | (5) (°C.) | (6) (m/min) | (7) (m/min) | (8) (°C.) | (9) (mm) | (10) (MPa) |
|---|---|---|---|---|---|---|---|---|---|---|
| 4 | MA-1 | 25 | 300 | 10 | — | 5.05 | 5.0 | 15 | −0.6 | 1.0 |
| C1 | LA-1 | 2 | 80 | 5 | 70 | — | 10.0 | | *1 | |

(1) the material
(2) the screw temperature difference (the temperature of the exit —the temperature of the entrance)
(3) the extrusion amount
(4) the difference in the pressure before and after the gear pump (the pressure in front of the gear pump - the pressure in the back of the gear pump)
(5) the temperature difference between the both sides of the melt on the casting roll
(6) the peripheral speed of the touch roll
(7) the peripheral speed of the casting roll
(8) the temperature difference between the casting roll and the touch roll
(9) the disagreement of the melt landing point from the center of the clearance between the touch roll and the casting roll
(10) the touch pressure of the touch roll
*1: Any touch roll was not used.

TABLE 2

| Acryl-base polymer film | Re (nm) | Rth (nm) | Wavelength dispersion of Re *1 | Wavelength dispersion of Rth *2 | β (°) |
|---|---|---|---|---|---|
| 1 | 9 | −29 | 0.2 | 1.6 | 15 |
| 2 | 3 | −6 | 0.1 | 1.2 | 30 |
| 3 | 5 | −10 | 0.2 | 1.1 | 45 |
| 4 | 5 | −7 | 0.2 | 1.4 | 10 |
| C1 | 0 | 0 | 0.2 | 1.2 | 0 |

*1: |Re(630) − Re(450)|
*2: |Rth(630) − Rth(450)|

TABLE 3

| COC film | (11) (MPa) | (12) (m/nin) | (13) (m/min) | (14) |
|---|---|---|---|---|
| 1 | 5 | 5.25 | 5 | 0.95 |
| 2 | 4 | 5.5 | 5 | 0.91 |
| 3 | 1 | 6 | 5 | 0.83 |
| C2*1 | — | — | 5 | — |

(11) the touch pressure of the touch roll the material
(12) the peripheral speed of the touch roll
(13) the peripheral speed of the casting roll
(14) the peripheral speed ratio
*1: Any touch roll was not used.

TABLE 4

| COC film | Re (nm) | Rth (nm) | Wavelength dispersion of Re *1 | Wavelength dispersion of Rth *2 | β (°) |
|---|---|---|---|---|---|
| 1 | 5 | 13 | 0.2 | 1.2 | −15 |
| 2 | 3 | 16 | 0.1 | 1 | −30 |
| 3 | 2 | 12 | 0.2 | 1.1 | −45 |
| C2 | 2 | 4 | 0.3 | 0.8 | 0 |

*1: |Re(630) − Re(450)|
*2: |Rth(630) − Rth(450)|

2. Production of COC Film

TOPAS #6013 pellets (Tg=136° C.) were used. These were dried at 110° C. for 2 hours or more, and then extruded using a single-screw kneading extruder. In this, a screen filter, a gear pump and a leaf disc filter were disposed in that order between the extruder and the die, and these were connected to each other via a melt pipe line. The melt was extruded out at an extrusion temperature of 260° C. through the die having a width of 1900 mm and a lip gap of 1 mm.

Next, the polymer melt was extruded out onto the center part of a chill roll and a touch roll. In this, the chill roll was a HCr-plated metal roll having a width of 2000 mm and a diameter of 400 mm; and the touch roll was one described in a first embodiment of JP-A 11-235747 having a width of 1700 mm and a diameter of 350 mm (as double-press roll; in this, however, the thickness of the thin-wall metal jacket was changed to 2 mm). The touch pressure was measured by sandwiching a prescale (by FUJIFILM) between the two rolls running at the same peripheral speed (5 m/min) with no melt therebetween, and the touch roll pressure was controlled as in the Table below.

Using these rolls, the touch roll peripheral speed, the chill roll peripheral speed, and the peripheral speed ratio were controlled as in the Table below. The touch roll and the chill roll were both at a temperature of Tg−5° C. The atmosphere in the film formation was 25° C. and 60% RH.

Next, just before wound up, the film was trimmed on both sides thereof (by 5 cm of the overall width), and then knurled on both sides thereof to a width of 10 mm and a height of 20 µm. The final film width was 1540 mm and the film was wound to a length of 450 m.

The COC films 1 to 3 and the comparative COC film C2 were analyzed according to the methods mentioned in the above to determine the tilt angle β[°], and also Re, Rth and the wavelength dispersion characteristics thereof. The results are shown in Table below.

3. Production Example for Polarizing Plate

Production of Polarizing Element

A polyvinyl alcohol film having a thickness of 80 µm was dyed in an aqueous iodine solution having a concentration of 5% by mass (ratio by mass: iodine/potassium iodide=1/10). Next, this was dipped in an aqueous solution containing 3% by mass of boric acid and 2% by mass of potassium iodide, and stretched in an aqueous solution containing 4% by mass of boric acid and 3% by mass of potassium iodide, by 6.0 times, and thereafter dipped in an aqueous solution of 5% by mass of potassium iodide. Next, this was dried in an oven at 40° C. for 3 minutes to give a polarizing element having a thickness of 30 µm.

(Preparation of Aqueous Solution of Polyvinyl Alcohol Adhesive)

An aqueous solution containing 100 parts by mass of acetoacetyl group-modified polyvinyl alcohol (having a degree of acetylation of 13%) and 20 parts by mass of methylolmelamine was prepared to have a concentration of 0.5% by mass. This is an aqueous solution of polyvinyl alcohol adhesive.

(Production of Polarizing Plate)

A cellulose resin (Eastman Chemical's, cellulose acetate propionate) was diluted in butyl acetate to prepare a solution having a solid concentration of 7.5% by weight. The solution was applied onto one surface of an acryl-base polymer film 1, and dried in an oven at 100° C. for 3 minutes to prepare a cellulose resin layer-coated, polarizing element-protective film. The dry thickness of the cellulose resin layer was 0.8 μm.

Using the aqueous solution of polyvinyl alcohol adhesive prepared in the above, the above-mentioned acryl-base polymer film 1 was stuck to one surface of the above-mentioned polarizing element, and a saponified triacetyl cellulose (TAC) film (FUJIFILM's Fujitac T-60, having a thickness of 60 μm) was to the other surface thereof. This was dried at 70° C. for 10 minutes to produce a polarizing plate, Polarizing Plate 1.

Polarizing Plates 2, 3 and C1 were produced in the same manner as that for Polarizing Plate 1, for which, however, the acryl-base polymer film 1 was changed to the acryl-base polymer film 2, 3 or C1. Polarizing Plates 4 to 6 were produced also in the same manner as above, in which, however, the sticking angle of the acryl-base polymer films 1 to 3 were shifted by 180 degrees so that β could be negative.

A polarizing plate, Polarizing Plate 7, was produced also in the same manner as above, in which, however, the acryl-base polymer film 1 was changed to the acryl-base polymer film 4.

Using the aqueous solution of polyvinyl alcohol adhesive prepared in the above, a saponified triacetyl cellulose (TAC) film (FUJIFILM's Fujitac T-60, having a thickness of 60 μm) was stuck to both surfaces of the polarizing element prepared in the above, thereby producing a polarizing plate, Polarizing Plate R1.

Using the aqueous solution of polyvinyl alcohol adhesive prepared in the above, a saponified triacetyl cellulose (TAC) film (FUJIFILM's Fujitac T-60, having a thickness of 60 μm) was stuck to one surface of the polarizing element prepared in the above, and using an adhesive, a biaxial film prepared by stretching TAC was stuck to the other surface thereof, thereby producing a polarizing plate, Polarizing Plate R2.

Using the aqueous solution of polyvinyl alcohol adhesive prepared in the above, the COC film 1 was stuck to one surface of a polarizing element, and a saponified triacetyl cellulose (TAC) film (FUJIFILM's Fujitac T-60, having a thickness of 60 μm) was to the other surface thereof. This was dried at 70° C. for 10 minutes to produce a polarizing plate, Polarizing Plate 8. Polarizing Plates 9, 10 and C2 were produced in the same manner as that for Polarizing Plate 8, for which, however, the COC film 1 was changed to the COC film 2, 3 or C2.

4. Production of Liquid-Crystal Display Device

Production Embodiment 1

Examples 1 to 3, and Comparative Example 1

An IPS-mode liquid-crystal display device having the same constitution as in FIG. 1 was produced. Concretely, as the polarizing plates PL1 and PL2 in FIG. 1, any of Polarizing Plates 1 to 3 produced in the above was used. More concretely, this is as follows:

An electrode pattern was formed on one glass substrate in such a manner that the distance between the adjacent electrode lines could be 20 μm, a polyimide film was provided thereon as an alignment film, and this was rubbed. A polyimide film was provided on one surface of another glass substrate and rubbed to be an alignment film. The two glass substrates were combined to be a cell in such a manner that their alignment films could face each other and that the rubbing direction thereof could be in parallel to each other. Then, a nematic liquid crystal composition having a refractivity anisotropy (Δn) of 0.0888 and a positive dielectric anisotropy (Δ∈) of 4.5 was sealed in the cell so that the cell gap d could be 3.5 μm, thereby producing a liquid-crystal cell having Δn×d of 311 nm. The pretilt was 1°.

Two sheets of Polarizing Plate 1 produced in the above were prepared, and disposed on and below the liquid-crystal layer to sandwich it therebetween. In this, the upper and lower polarizers were so disposed that their absorption axes could be perpendicular to each other. The acryl-base polymer film 1 faced the liquid-crystal cell side. In this, the members were so disposed that the pretilt direction of the liquid-crystal cell could be the same as the β direction of the acryl-base polymer film. The process gave an IPS-mode liquid-crystal display device 1 of Example 1.

Liquid-crystal display devices 2 and 3 having the same constitution as in FIG. 1 were produced in the same manner as that for the liquid-crystal display device 1, for which, however, Polarizing Plate 1 was changed to Polarizing Plate 2 or 3.

A liquid-crystal display device C1 of Comparative Example having the same constitution as in FIG. 1 was produced in the same manner as that for the liquid-crystal display device 1, for which, however, Polarizing Plate 1 was changed to Polarizing Plate C1.

Production Embodiment 2

Examples 4 to 6, and Comparative Example 2

An IPS-mode liquid-crystal display device having the same constitution as in FIG. 2 was produced. Concretely, as the polarizing plate PL1' in FIG. 2, Polarizing Plate R1 produced in the above was used. As the film 16 in FIG. 2, JSR's Arton film (Re=200 nm, Rth=−30 nm) was used. As polarizing plate PL2 in FIG. 2, any of Polarizing Plates 4 to 6 produced in the above was used. The others were the same as in Production Embodiment 1, and liquid-crystal display devices 4 to 6 were produced herein. In this, the members were so disposed that the pretilt direction of the liquid-crystal cell could be opposite to the β direction of the acryl-base polymer film (in the mirror-symmetric direction to each other).

A liquid-crystal display device C2 of Comparative Example was produced in the same manner as that for the liquid-crystal display device 4, for which, however, Polarizing Plate 4 was changed to Polarizing Plate C1.

Production Embodiment 3

Example 7, and Comparative Example 3

An IPS-mode liquid-crystal display device having the same constitution as in FIG. 3 was produced. Concretely, as the polarizing plate PL1" in FIG. 3, Polarizing Plate R2 produced in the above was used. As the protective film 14' in FIG. 3, a biaxial film prepared by stretching TAC (Re=61 nm, Rth=194 nm) was used; and as the positive C-plate 18, a film having Re=0 nm and Rth=240 nm was used. As polarizing plates PL2 in FIG. 3, Polarizing Plate 7 produced in the above was used. The others were the same as in Production Embodiment 1, and a liquid-crystal display device 7 was produced herein. In this, the members were so disposed that the pretilt direction of the liquid-crystal cell could be the same as that of the β direction of the acryl-base polymer film.

A liquid-crystal display device C3 was produced in the same manner as that for the liquid-crystal display device 7, for which, however, Polarizing Plate 7 was changed to Polarizing Plate C1.

Production Embodiment 4

Examples 8 to 10

An IPS-mode liquid-crystal display device having the same constitution as in FIG. 1 was produced. Concretely, as the polarizing plates PL1 and PL2 in FIG. 1, any of Polarizing Plates 8 to 10 produced in the above was used. The others were the same as in Production Embodiment 1, and liquid-crystal display devices 8 to 10 were produced herein. In this, the members were so disposed that the pretilt direction of the liquid-crystal cell could be opposite to the β direction of the COC film (in the mirror-symmetric direction to each other).

A liquid-crystal display device C4 was produced in the same manner as that for the liquid-crystal display device 8, for which, however, Polarizing Plate 8 was changed to Polarizing Plate C2.

5. Evaluation of Liquid-Crystal Display Device

The liquid-crystal display devices produced in the above were tested for light leakage at the time of black level of display thereof, in the manner mentioned below.

Figure 4:
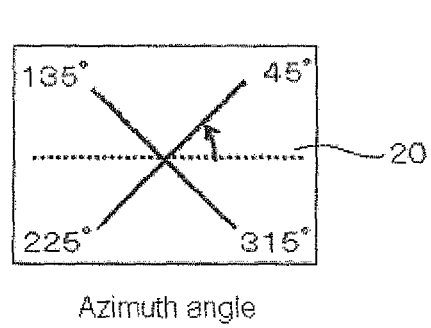
FIG. 4 is a view for use in explaining the method for measuring the level of light leakage in Examples.
Figure 4:
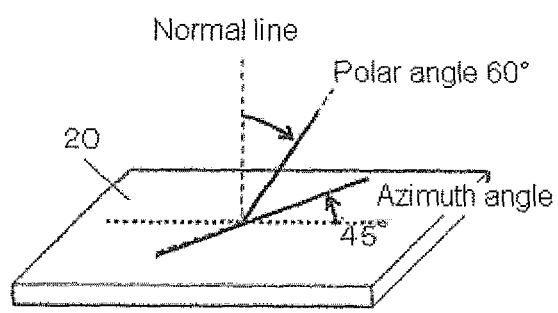

As in FIG. 4(a), the azimuth angle direction was taken at 45°, 135°, 225° and 315° on the panel surface; and as in FIG. 4(b), the level of light leakage at the time of black level of display in the direction as rotated to the polar angle of 60° from the normal direction was determined, using a color brightness meter (Topcon's BM-5). The results are shown in the Table below.

TABLE 5

|  |  |  |  |  | Light leakage (%) *1 | | | |
| --- | --- | --- | --- | --- | --- | --- | --- | --- |
| Example | LCD | Structure | Polarizing plate | β (°) | 45° | 135° | 225° | 315° |
| 1 | 1 | FIG. 1 | 1 | 15 | 1.08 | 1.08 | 1.26 | 1.26 |
| 2 | 2 | FIG. 1 | 2 | 30 | 1.12 | 1.12 | 1.23 | 1.23 |
| 3 | 3 | FIG. 1 | 3 | 45 | 1.14 | 1.14 | 1.21 | 1.21 |
| Comparison 1 | C1 | FIG. 1 | C1 | 0 | 1.02 | 1.02 | 1.31 | 1.31 |
| 4 | 4 | FIG. 2 | 4 | −15 | 0.27 | 0.27 | 0.33 | 0.33 |
| 5 | 5 | FIG. 2 | 5 | −30 | 0.31 | 0.31 | 0.32 | 0.32 |
| 6 | 6 | FIG. 2 | 6 | −45 | 0.34 | 0.34 | 0.33 | 0.33 |
| Comparison 2 | C2 | FIG. 2 | C1 | 0 | 0.24 | 0.24 | 0.36 | 0.36 |
| 7 | 7 | FIG. 3 | 7 | 10 | 0.18 | 0.18 | 0.16 | 0.16 |
| Comparison 3 | C3 | FIG. 3 | C1 | 0 | 0.16 | 0.16 | 0.19 | 0.19 |
| 8 | 8 | FIG. 1 | 8 | −15 | 0.95 | 0.95 | 1.09 | 1.09 |
| 9 | 9 | FIG. 1 | 9 | −30 | 1.02 | 1.02 | 1.04 | 1.04 |
| 10 | 10 | FIG. 1 | 10 | −45 | 1.10 | 1.10 | 1.01 | 1.01 |
| Comparison 4 | C4 | FIG. 1 | C2 | 0 | 0.87 | 0.87 | 1.15 | 1.15 |

*1: the amount of light leakage in the direction with a polar angle of 60 degrees and an azimuth angle of 45, 135, 225 or 315 degrees.

The above results confirm that the liquid-crystal display devices 1 to 3 and 8 to 10 of Examples of the invention were improved over the liquid-crystal display devices C1 and C4 of Comparative examples, in point of the symmetricity in light leakage in four azimuth angle directions. These also confirm that the liquid-crystal display devices 4 to 7 of Examples of the invention had little light leakage and were also improved over the liquid-crystal display devices C2 and C3 of Comparative Examples in point of the symmetricity thereof.

FFS-mode liquid-crystal display devices were produced and evaluated in the same manner as above, and it was confirmed that they had little light leakage were improved in point of the symmetricity.

Liquid-crystal display devices 11 to 20 and C5 to C8 were produced under the same conditions for the laminate structure, the polarizer and β as in Examples 1 to 10 and Comparative Examples 1 to 4, for which, however, the pretilt of the liquid-crystal cell was changed to 5°. These are Examples 11 to 20 and Comparative Examples 5 to 8.

TABLE 6

|  |  |  |  |  | Light leakage (%) *1 | | | |
| --- | --- | --- | --- | --- | --- | --- | --- | --- |
| Example | LCD | Structure | Polarizing plate | β (°) | 45° | 135° | 225° | 315° |
| 11 | 11 | FIG. 1 | 1 | 15 | 0.73 | 0.73 | 2.12 | 2.12 |
| 12 | 12 | FIG. 1 | 2 | 30 | 0.77 | 0.77 | 2.10 | 2.10 |
| 13 | 13 | FIG. 1 | 3 | 45 | 0.79 | 0.79 | 2.09 | 2.09 |

TABLE 6-continued

| Example | LCD | Structure | Polarizing plate | β (°) | Light leakage (%) *1 45° | 135° | 225° | 315° |
|---|---|---|---|---|---|---|---|---|
| Comparison 5 | C5 | FIG. 1 | C1 | 0 | 0.67 | 0.67 | 2.15 | 2.15 |
| 14 | 14 | FIG. 2 | 4 | −15 | 0.15 | 015 | 0.72 | 0.72 |
| 15 | 15 | FIG. 2 | 5 | −30 | 0.19 | 0.19 | 0.7 | 0.7 |
| 16 | 16 | FIG. 2 | 6 | −45 | 0.22 | 0.22 | 0.71 | 0.71 |
| Comparison 6 | C6 | FIG. 2 | C1 | 0 | 0.11 | 0.11 | 0.75 | 0.75 |
| 17 | 17 | FIG. 3 | 7 | 10 | 0.3 | 0.3 | 0.44 | 0.44 |
| Comparison 7 | C7 | FIG. 3 | C1 | 0 | 0.28 | 0.28 | 0.46 | 0.46 |
| 18 | 18 | FIG. 1 | 8 | −15 | 0.63 | 0.63 | 2.01 | 2.01 |
| 19 | 19 | FIG. 1 | 9 | −30 | 0.68 | 0.68 | 2.01 | 2.01 |
| 20 | 20 | FIG. 1 | 10 | −45 | 0.69 | 0.69 | 2.02 | 2.02 |
| Comparison 8 | C8 | FIG. 1 | C2 | 0 | 0.56 | 0.56 | 2.05 | 2.05 |

*1: the amount of light leakage in the direction with a polar angle of 60 degrees and an azimuth angle of 45, 135, 225 or 315 degrees.

The data confirm that the liquid-crystal display devices of Examples of the invention were also improved over the comparative liquid-crystal display devices in point the symmetricity thereof when the pretilt of the liquid-crystal cell was 5°. The same applies also to the liquid-crystal display devices where the pretilt of the liquid-crystal cell was 0.5°.

The invention claimed is:

1. An optical compensation film for IPS or FFS-mode liquid crystal display devices, having the tilt angle θ[°] not equal to zero, β[°] being defined as φ giving the minimum value of retardation R[φ] which is retardation measured for incident light coming in a direction tilted by φ° from a normal line relative to the film-plane, with the in-plane slow axis of the optical compensation film as a rotation axis;
   having retardation in plane at a wavelength of 550 nm, Re(550), of from 0 nm to 10 nm;
   having retardation along the thickness direction at a wavelength of 550 nm, Rth(550), of from −30 nm to 30 nm, provided that Rth(550) is not equal to zero; and
   having wavelength dispersion characteristics of Re, |Re(630)−Re(450)|, of equal to or less than 1.5 nm, and wavelength dispersion characteristics of Rth, |Rth(630)−Rth(450)|, of equal to or less than 4 nm.

2. The optical compensation film for IPS or FFS-mode liquid crystal display devices of claim 1, which is an acryl-base polymer film.

3. The optical compensation film for IPS or FFS-mode liquid crystal display devices of claim 2, comprising as a major ingredient, an acryl-base polymer having at least one unit selected from the group consisting of lactone ring unit, maleic anhydride unit, and glutaric anhydride unit.

4. The optical compensation film for IPS or FFS-mode liquid crystal display devices of claim 1, which comprises a cycloolefin polymer-base film.

5. An IPS or FFS-mode liquid crystal display device comprising:
   a pair of substrates at least one of which has an electrode and which are disposed to face each other, the electrode forming an electric field having a component parallel to the electrode-having substrate;
   an alignment-controlled liquid-crystal layer disposed between the pair of substrates; and
   a pair of polarizers disposed to sandwich the liquid-crystal layer therebetween;
   wherein at least one of the pair of polarizers has at least one optical compensation film of claim 1.

6. The IPS or FFS-mode liquid crystal display device of claim 5, wherein Δn×d is from 250 nm to 400 nm, wherein Δn represents the birefringence of liquid-crystal molecules in the liquid-crystal layer and d represents the thickness of the liquid-crystal layer.

7. The IPS or FFS-mode liquid crystal display device of claim 5, wherein the pretilt angle of liquid-crystal molecules in the liquid-crystal layer is from 0.2 to 10°.

8. An IPS or FFS-mode liquid-crystal display device comprising:
   a pair of polarizing elements,
   a liquid-crystal cell horizontally aligned between the pair of polarizing elements, and
   an optical compensation film of claim 1 individually between each of the pair of polarizing elements and the liquid-crystal cell.

9. An IPS or FFS-mode liquid-crystal display device comprising:
   a pair of polarizing elements, and
   a liquid-crystal cell horizontally aligned, disposed between the pair of polarizing elements,
   a film of claim 1 disposed between one of the pair of polarizing elements and the liquid-crystal cell, and
   a cycloolefin-base polymer film disposed between the other of the pair of polarizing elements and the liquid-crystal cell.

10. An IPS or FFS-mode liquid-crystal display device comprising:
    a pair of polarizing elements,
    a liquid-crystal cell horizontally aligned, disposed between the pair of polarizing elements,
    a film of claim 1 disposed between one of the pair of polarizing elements and the liquid-crystal cell, and
    an optically-biaxial film and a positive C-plate between the other of the pair of polarizing elements and the liquid-crystal cell.

11. The optical compensation film for IPS or FFS-mode liquid crystal display devices of claim 1, which has the thickness of from 20 μm to 200 μm.

12. The optical compensation film for IPS or FFS-mode liquid crystal display devices of claim 1, which has the thickness unevenness of from 0% to 3%.

13. The optical compensation film for IPS or FFS-mode liquid crystal display devices of claim 1, which has a mean film width of from 1 m to 3 m.

14. The optical compensation film for IPS or FFS-mode liquid crystal display devices of claim 1, which has the film width fluctuation of from 1% to 15%.

15. The optical compensation film for IPS or FFS-mode liquid crystal display devices of claim 1, which has height of knurl of from 1 μm to 50 μm.

16. The optical compensation film for IPS or FFS-mode liquid crystal display devices of claim 1, which has width of knurl of from 1 mm to 50 mm.

17. The optical compensation film for IPS or FFS-mode liquid crystal display devices of claim 1, having retardation in plane at a wavelength of 550 nm, Re(550), of from 0 nm to 5 nm.

* * * * *